United States Patent
Zhao et al.

(10) Patent No.: US 11,302,983 B2
(45) Date of Patent: Apr. 12, 2022

(54) BATTERY MODULE FRAME FOR A BATTERY MODULE OF A BATTERY SYSTEM

(71) Applicants: TE CONNECTIVITY SERVICES GMBH, Schaffhausen (CH); TYCO ELECTRONICS BRASIL LTDA, Braganca Paulista (BR)

(72) Inventors: Weiping Zhao, Superior Township, MI (US); Jeremy Christin Patterson, Winston-Salem, NC (US); Amadeu Luiz Fazani Cavallieri, Campinas (BR)

(73) Assignees: Tyco Electronics Brasil LTDA; TE Connectivity Services GmbH

( * ) Notice: Subject to any disclaimer, the term of this patent is extended or adjusted under 35 U.S.C. 154(b) by 138 days.

(21) Appl. No.: 16/663,114

(22) Filed: Oct. 24, 2019

(65) Prior Publication Data
US 2021/0126229 A1    Apr. 29, 2021

(51) Int. Cl.
*H01M 50/20* (2021.01)
*H01M 10/48* (2006.01)
*H01M 50/502* (2021.01)
*B60L 50/64* (2019.01)

(52) U.S. Cl.
CPC ......... *H01M 50/20* (2021.01); *H01M 10/482* (2013.01); *H01M 50/502* (2021.01); *B60L 50/64* (2019.02); *H01M 2220/20* (2013.01)

(58) Field of Classification Search
CPC .. H01M 50/20; H01M 50/502; H01M 50/204; H01M 50/264; H01M 10/482; H01M 2200/20; H01M 50/02; B60L 50/64
See application file for complete search history.

(56) References Cited

U.S. PATENT DOCUMENTS

| | | | | |
|---|---|---|---|---|
| 2004/0053128 A1* | 3/2004 | Smith | ................. | H01M 50/147 429/175 |
| 2006/0024566 A1* | 2/2006 | Plummer | .......... | H01M 10/6571 429/100 |
| 2011/0244292 A1* | 10/2011 | Kale | ................. | H01M 10/6563 429/120 |
| 2013/0078488 A1* | 3/2013 | Nemoto | .............. | H01M 10/625 429/82 |
| 2018/0090725 A1* | 3/2018 | Huff | ....................... | H01M 50/20 |
| 2018/0269446 A1* | 9/2018 | Idikurt | .............. | H01M 10/6555 |
| 2019/0086476 A1* | 3/2019 | Clark | ................... | G01R 31/371 |
| 2020/0022260 A1* | 1/2020 | Takamatsu | .......... | H01M 10/482 |
| 2020/0321589 A1* | 10/2020 | Watahiki | ............. | H01M 50/572 |

\* cited by examiner

*Primary Examiner* — Maria Laios
*Assistant Examiner* — Adam J Francis

(57) ABSTRACT

A battery module frame includes first and second frame sections each having a main body, an upper side wall extending from the main body, and a lower side wall extending from the main body. The main body has a bus bar pad for a bus bar that is configured to be electrically connected to battery cells of the battery module. The upper and lower side walls include upper and lower mounting features. The first and second frame sections are coupled at a seam with the upper mounting features removably coupled together at an upper separable interface and with the lower mounting features removably coupled together at a lower separable interface. The first and second frame sections are coupled together with the bus bar pads of the main bodies coplanar.

23 Claims, 13 Drawing Sheets

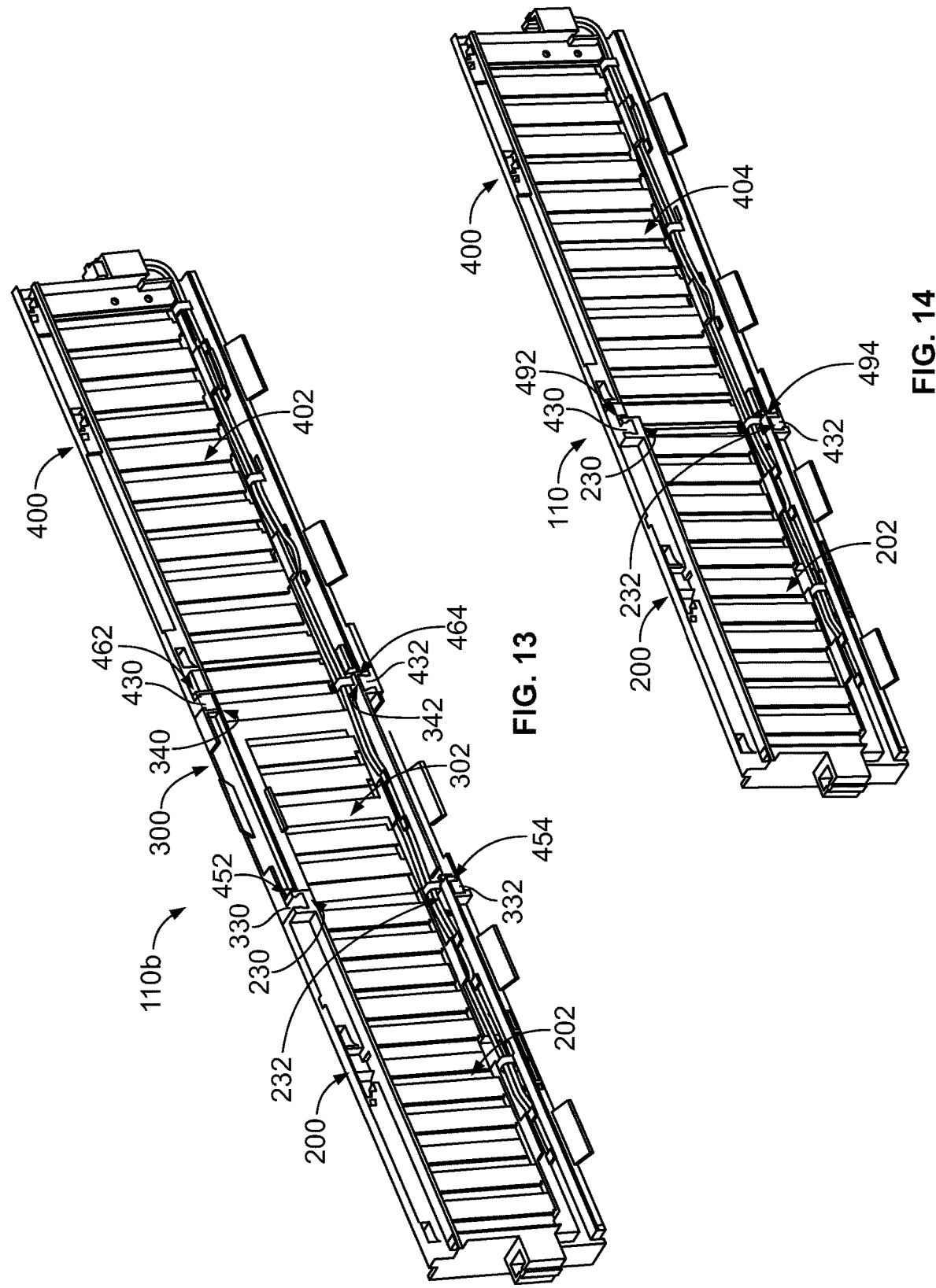

BATTERY MODULE FRAME FOR A BATTERY MODULE OF A BATTERY SYSTEM

BACKGROUND OF THE INVENTION

The subject matter herein relates generally to battery modules for battery systems.

Battery modules, such as those for electric vehicles or hybrid vehicles, typically includes a plurality of cells grouped together to form the battery modules. The battery modules are connected together to form battery packs. Each of the cells includes cell terminals that are electrically connected together using bus bars. Assembly of the battery module is difficult. For example, containment of the many components is problematic. Some known battery modules utilize a carrier or frame to hold components, such as the bus bars, which is coupled to the battery cells to form the battery module. However, various battery modules have different numbers of battery cells, leading to many different size frames. Additionally, the frames are typically long and narrow, making manufacture and utilization of such frames problematic. For example, the frames are subject to warpage during manufacture or during use due to heating and cooling cycles. The warpage may lead to damage or cracking of the frame or misplacement of some of the components within the battery module.

Furthermore, safety regulations, such as section 38.3 of the UN Manual of Tests and Criteria (UN Transportation Testing UN 38.3), require that the battery modules be protected during transportation to protect from electrical shorting, which could lead to overheating and/or fire of the battery module. For example, the battery module is required to be fused to avoid hazard during transportation, such as from the battery module manufacturer to the vehicle manufacturer that installs the battery module in a vehicle. Battery module manufacturers typically add an additional fuse to the battery module that is removed by the vehicle manufacturer when the battery module is installed in the vehicle. Such additional fuses are expensive and are discarded after the single use.

A need remains for a cost effective and reliable battery module.

BRIEF DESCRIPTION OF THE INVENTION

In one embodiment, a battery module frame for a battery module is provided. The battery module frame includes a first frame section has a first main body, a first upper side wall extending from the first main body and a first lower side wall extending from the first main body. The first main body has a first bus bar pad for a bus bar that is configured to be electrically connected to battery cells of the battery module. The first upper side wall includes a first upper mounting feature. The first lower side wall includes a first lower mounting feature. The battery module frame includes a second frame section that is separate and discrete from the first frame section. The second frame section has a second main body, a second upper side wall extending from the second main body and a second lower side wall extending from the second main body. The second main body has a second bus bar pad for a bus bar that is configured to be electrically connected to battery cells of the battery module. The second upper side wall includes a second upper mounting feature. The second lower side wall includes a second lower mounting feature. The first and second frame sections are coupled at a seam with the second upper mounting feature removably coupled to the first upper mounting feature at an upper separable interface and the second lower mounting feature removably coupled to the first lower mounting feature at a lower separable interface. The first and second frame sections are coupled together with the first and second bus bar pads of the first and second main bodies coplanar.

In another embodiment, a battery module frame for a battery module is provided. The battery module frame includes a first frame section having a first main body, a first upper side wall extending from the first main body and a first lower side wall extending from the first main body. The first main body has a first bus bar pad. The first upper side wall includes a first upper mounting feature. The first lower side wall includes a first lower mounting feature. The battery module frame includes a second frame section that is separate and discrete from the first frame section. The second frame section has a second main body, a second upper side wall extending from the second main body and a second lower side wall extending from the second main body. The second main body has a second bus bar pad. The second upper side wall includes a second upper mounting feature. The second lower side wall includes a second lower mounting feature. The second frame section is coupled to the first frame section at a seam with the second upper mounting feature removably coupled to the first upper mounting feature at an upper separable interface and the second lower mounting feature removably coupled to the first lower mounting feature at a lower separable interface such that the first and second bus bar pads are coplanar. The battery module frame includes bus bars that are coupled to the first and second bus bar pads. The bus bars are configured to be electrically connected to battery cells of the battery module. A sensor assembly is coupled to the first and second main bodies. The sensor assembly includes voltage sensors electrically coupled to corresponding bus bars.

In a further embodiment, a battery system is provided. The battery system includes a plurality of battery cells that are stacked forming a battery module. A battery module frame is mounted to the battery module. The battery module frame includes a first frame section and a second frame section that is separate and discrete from the first frame section and is coupled to the first frame section at a seam. The first frame section has a first main body, a first upper side wall extending from the first main body and a first lower side wall extending from the first main body. The first main body has a first bus bar pad. The first upper side wall includes a first upper mounting feature. The first lower side wall includes a first lower mounting feature. The second frame section has a second main body. A second upper side wall extends from the second main body and a second lower side wall extends from the second main body. The second main body has a second bus bar pad. The second upper side wall includes a second upper mounting feature that is removably coupled to the first upper mounting feature. The second lower side wall includes a second lower mounting feature that is removably coupled to the first lower mounting feature. The battery system includes bus bars coupled to the first and second bus bar pads. The bus bars are electrically connected to corresponding battery cells of the battery module. A sensor assembly is coupled to the first and second main bodies. The sensor assembly includes voltage sensors electrically coupled to corresponding battery cells of the battery module.

BRIEF DESCRIPTION OF THE DRAWINGS

FIG. 13 is a perspective view of a rear battery module frame in an assembled state in accordance with an exemplary embodiment.

FIG. 14 is a perspective view of the battery module frame in an assembled state in accordance with an exemplary embodiment.

DETAILED DESCRIPTION OF THE INVENTION

Figure 1:
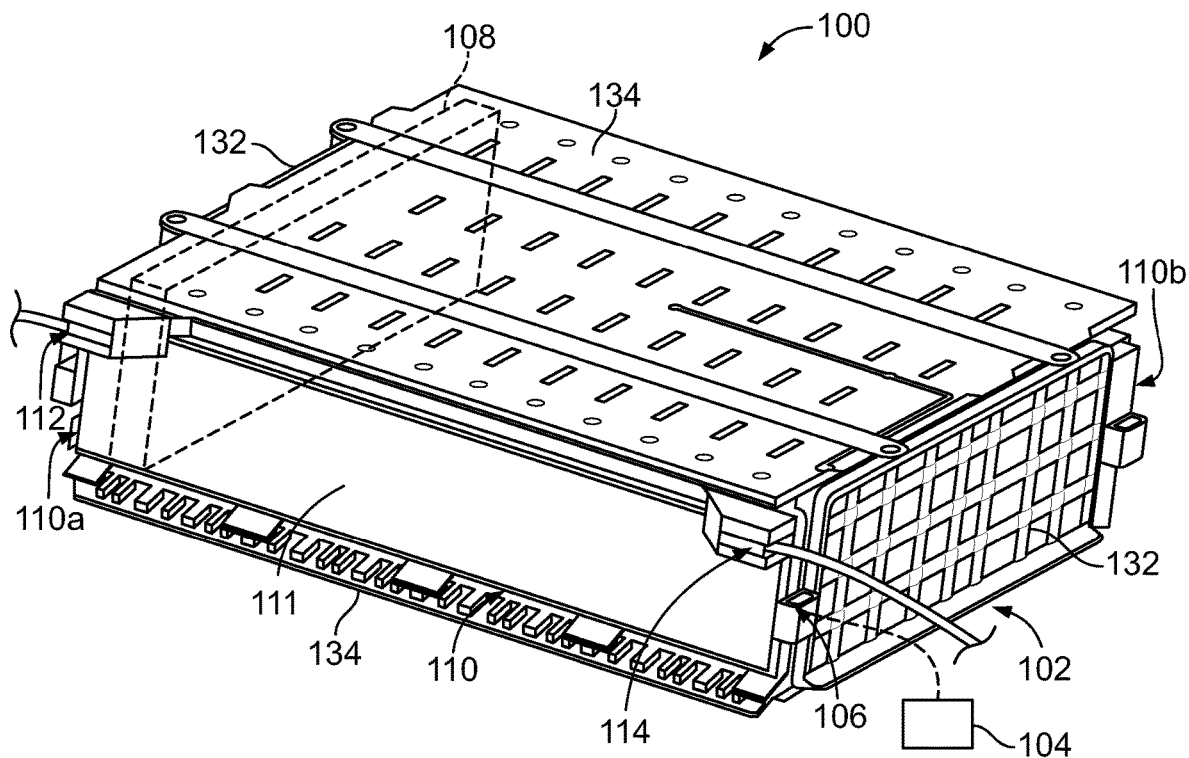
FIG. 1 is a front perspective view of a battery system formed in accordance with an exemplary embodiment.
Figure 2:
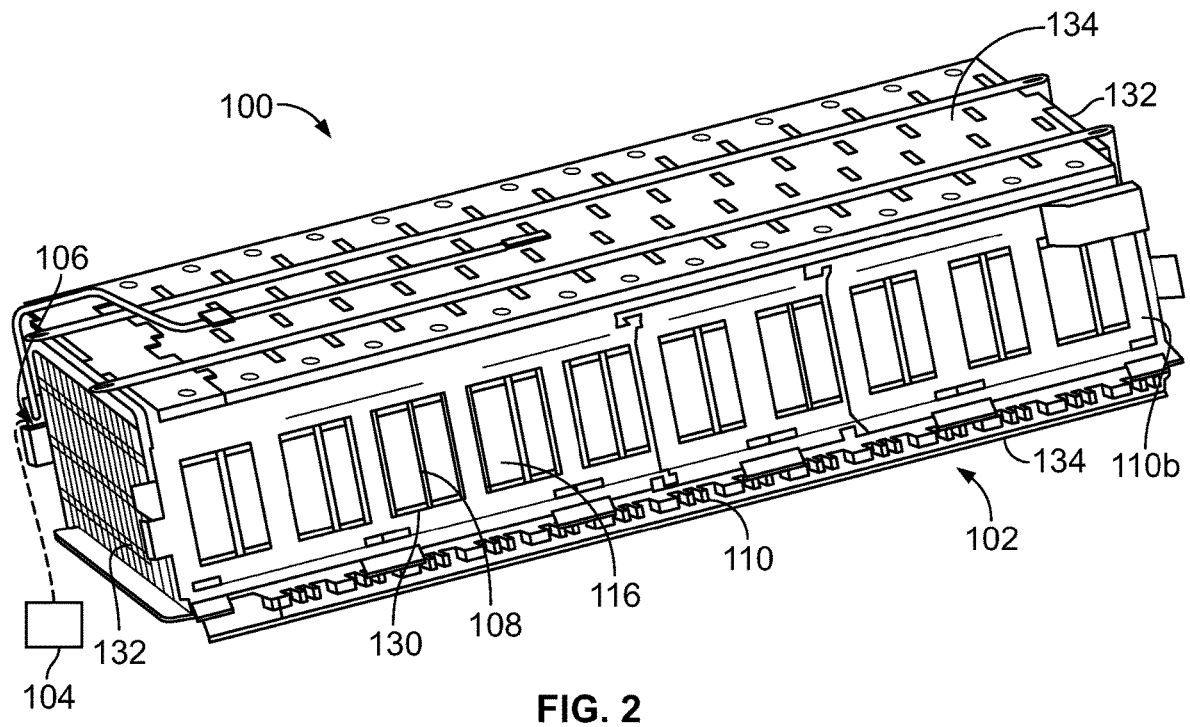
FIG. 2 is a rear perspective view of a battery system formed in accordance with an exemplary embodiment.

FIG. 1 is a front perspective view of a battery system 100 formed in accordance with an exemplary embodiment. FIG. 2 is a rear perspective view of a battery system 100 formed in accordance with an exemplary embodiment. The battery system 100 includes a battery module 102 and battery module frames 110 mounted to the battery module 102. The battery module frame 110 may include a cover 111 coupled thereto covering components held by the battery module frame 110. Optionally, multiple battery modules 102 may be stacked together as a battery pack used as part of the battery system 100, such as a battery system in a vehicle, such as an electric vehicle or a hybrid electrical vehicle. The battery system 100 may be used in other applications in alternative embodiments. The battery module(s) 102 may be contained within a housing.

In an exemplary embodiment, the battery system 100 includes a battery control module 104, which may be mounted near or to the battery module 102. The battery control module 104 controls activities of the battery module 102 and/or the vehicle. The battery control module 104 may include or communicate with a vehicle system controller to verify that the battery module 102 is operating within the parameters set for the current condition of the battery module 102. The battery control module 104 may monitor the voltage of the cells of the battery module 102. The battery control module 104 may monitor the temperature of the battery module 102. The battery control module 104 may supply fault codes to the vehicle.

The battery system 100 includes a connector assembly 106 coupled to the battery control module 104, such as to the battery control module 104. The connector assembly 106 is electrically coupled to voltage sensors, temperature sensors or other types of sensors within the battery module 102 and routed to the battery control module 104. The connector assembly 106 may be held by the battery module frame 110 and extend from the battery module frame 110 to the battery control module 104.

The battery module 102 includes a plurality of battery cells 108 (shown in phantom), such as prismatic battery cells. The battery cells 108 are arranged in a stacked configuration, side-by-side, to form the battery module 102. Optional, the battery module 102 may include a case or other housing that holds the battery cells 108, such as end plates or other frame elements that hold the battery cells 108 together in the stack. A battery cover may be provided around the battery cells 108. The battery cover may cover each of the battery cells 108.

Each battery module 102 includes a positive battery terminal 112 (FIG. 1) and a negative battery terminal 114 (FIG. 1). The battery terminals 112, 114 are held by the battery module frame 110. The battery terminals 112, 114 are configured to be coupled to external power cables or alternatively may be bussed to battery terminals 112, 114 of another battery module 102, such as using power terminals or bus bars.

The battery module frames 110 are coupled to opposite sides of the stack of battery cells 108, and may be referred to hereinafter as a front battery module frame 110a (FIG. 1) and a rear battery module frame 110b (FIG. 2). The front and rear battery module frames 110a, 110b may be similar to each other and include similar features and components. In various embodiments, the front battery module frame 110a includes the positive battery terminal 112 and the negative battery terminal 114, whereas the rear battery module frame 110b does not include any battery terminals. In other various embodiments, the battery module 102 includes a single battery module frame 110 coupled to one side of the stack of battery cells 108.

Each battery module frame 110 holds a plurality of bus bars 116 (FIG. 2) configured to be electrically connected to corresponding battery cells 108 of the battery module 102. The bus bars 116 are used to electrically connect adjacent battery cells 108. In various embodiments, the bus bars 116 may be overmolded by a dielectric body to form the battery module frame 110. In other various embodiments, the bus bars 116 are coupled to the battery module frame 110. In an exemplary embodiment, one of the battery module frames 110 holds battery terminal bus bars 118 (shown in FIG. 4), which may define part of or be electrically connected to the battery terminals 112, 114. In an exemplary embodiment, the battery terminal bus bars 118 may be fused bus bars that provide a fused connection for the battery module 102, such as for shipping, handling, and the like prior to assembly and use of the battery module 102 in the vehicle. In an exemplary embodiment, one of the battery module frames 110 holds the connector assembly 106. The bus bars 116 have voltage sensors associated therewith and the connector assembly 106 is electrically connected to corresponding voltage sensors for monitoring voltage of the bus bars 116 and the battery cells 108. In other various embodiments, both of the battery module frames 110 may hold corresponding battery terminal bus bars 118 and/or corresponding connector assemblies 106.

The battery module frames 110 are elongated to span the entire width of the battery module 102 alongside each of the battery cells 108. In an exemplary embodiment, each battery module frame 110 is manufactured from a plurality of frame sections, separate and discrete from each other, and coupled together to form the battery module frame 110. The individual frame sections are manufactured from a plastic material and may be separately molded and then coupled together to form the battery module frame 110. A height-to-width ratio of each of the individual frame sections is greater than a height-to-width ratio of the entire battery module frame 110, making each of the individual frame sections more manufacturable than manufacturing a very long and narrow, single piece battery module frame. The individual frame sections are shorter than a single piece battery module frame, reducing the risk of warpage of the individual frame sections during molding or during operation of the battery module 102 caused by heating of the battery cells 108.

In an exemplary embodiment, the battery module frame 110 is modular in design allowing interconnection of different frame sections to lengthen or shorten the battery module frame 110 to accommodate greater or fewer battery cells within a stack to form the battery module 102. For example, in various embodiments, the battery module frame 110 may include a right end frame section, a left end frame section, and a center frame section. Any number of the center frame sections may be provided between the right and left end frame sections to expand or lengthen the battery module frame 110. In some configurations, the center frame section may be removed, allowing direct connection of the right and left end frame sections.

In an exemplary embodiment, each battery cell 108 includes a cell housing, which may be box-shaped, such as including a top, a bottom, side walls and end walls. The cell housing may have other shapes in alternative embodiments. The cell housings are stacked with the end walls against each other and the side walls aligned for receiving the battery module frames 110. The battery module frames 110 are configured to be coupled to the side walls. In an exemplary embodiment, the battery module 102 includes end plates 132 coupled at opposite ends of the stack of battery cells 108. The end plates 132 may be coupled to the outer end walls of the outermost battery cells 108. Optionally, the end plates 132 may be coupled together by crossbeams and/or covers 134 extending across each of the battery cells 108, such as along the top and/or the bottom of the battery module 102.

Each battery cell 108 includes cell terminals 130 (FIG. 2), such as at opposite sides of the cell housing. The cell terminals 130 may include positive cell terminals and negative cell terminals. The cell terminals 130 are electrically connected to the bus bars 116. Optionally, for the end battery cells 108 in the cell stack, the cell terminals 130 may define the battery terminal 112 or 114 for the battery module 102.

Figure 3:
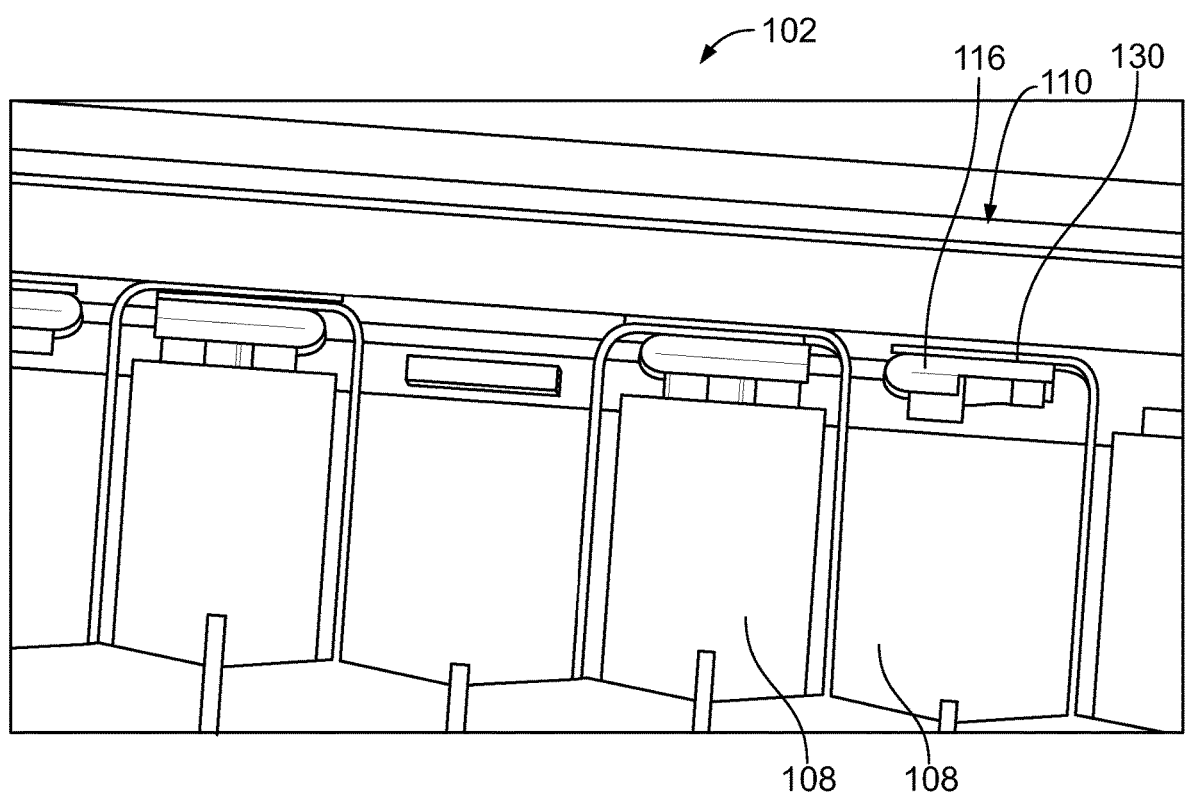
FIG. 3 is a sectional view of a battery module of the battery system showing battery cells and cell terminals.

FIG. 3 is a sectional view of the battery module 102 showing the battery cells 108 and the cell terminals 130. The battery module frame 110 extends along the sides of the battery cells 108. The battery module frame 110 holds the bus bars 116. The cell terminals 130 extend from the sides of the battery cells 108 to interface with the bus bars 116. In various embodiments, positive cell terminals are arranged in pairs and connected by the bus bar 116 and the negative cell terminals are arranged in pairs and connected by the bus bar 116. In some embodiments, all of the positive cell terminals are provided at one side of the battery module 102 and all of the negative cell terminals are provided at the opposite side of the battery module 102. In other various embodiments, both sides of the battery module 102 include both positive battery cells and negative battery cells.

The cell terminals 130 may include flat pads that define connection interfaces for electrical connection to corresponding bus bars 116. For example, in various embodiments, the cell terminals 130 include tabs, such as weld tabs, configured to be jointed to the bus bar 116 by laser welding, or by other processes. The cell terminals 130 may include posts extending therefrom, such as threaded posts, for mechanical and electrical connection with the bus bars 116. In other various embodiments, the cell terminals 130 may include weld pads for welding the bus bars 116 to the cell terminals 130. In other various embodiments, the cell terminals 130 may include openings, such as threaded openings to receive threaded fasteners to electrically connect the bus bars 116 to the cell terminals 130.

Figure 4:
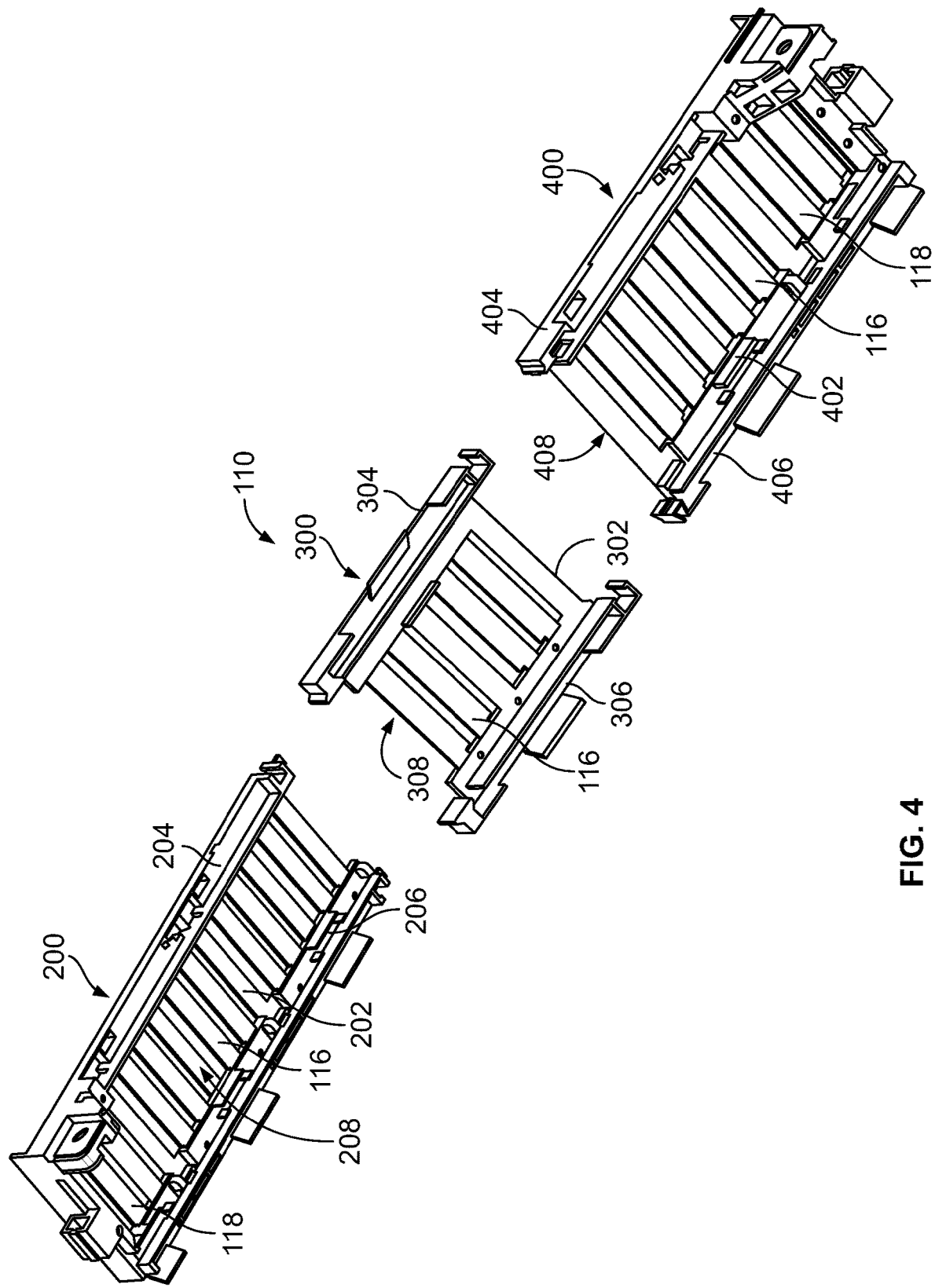
FIG. 4 is an exploded view of a battery module frame in accordance with an exemplary embodiment.

FIG. 4 is an exploded view of the battery module frame 110 in accordance with an exemplary embodiment, such as the front battery module frame 110a having the positive and negative battery terminals 112, 114 (the rear battery module frame 110b shown in FIG. 2 may include similar features and components). The battery module frame 110 includes a first frame section 200, a second frame section 300, and a third frame section 400. In the illustrated embodiment, the first frame section 200 is a right end frame section, the second frame section 300 is a center frame section, and the third frame section 400 is a left end frame section. Optionally, multiple second frame sections 300 may be provided between the first and third frame sections 200, 400 to increase the length of the battery module frame 110 for interfacing with a greater number of battery cells 108. In other various embodiments, the second frame section 300 may be removed allowing the first and third frame sections 200, 400 to be directly connected together to reduce the length of the battery module frame 110 for interfacing with fewer battery cells 108. The frame sections 200, 300, 400 may include similar features and elements or features of the frame sections 200, 300, 400 may be designated with "first", "second", "third" identifiers, respectively.

The first frame section 200 includes a first main body 202, a first upper side wall 204 extending from the first main body 202, and a first lower side wall 206 extending from the first main body 202. The first main body 202 includes a first bus bar pad 208 holding or receiving one or more of the bus bars 116. The first bus bar pad 208 may receive one of the battery terminal bus bars 118 in various embodiments.

The second frame section 300 includes a second main body 302, a second upper side wall 304 extending from the second main body 302, and a second lower side wall 306 extending from the second main body 302. The second main body 302 includes a second bus bar pad 308 holding or receiving one or more of the bus bars 116.

The third frame section 400 includes a third main body 402, a third upper side wall 404 extending from the third main body 402, and a third lower side wall 406 extending from the third main body 402. The third main body 402 includes a third bus bar pad 408 holding or receiving one or more of the bus bars 116. The third bus bar pad 408 may receive one of the battery terminal bus bars 118 in various embodiments.

Figure 5:
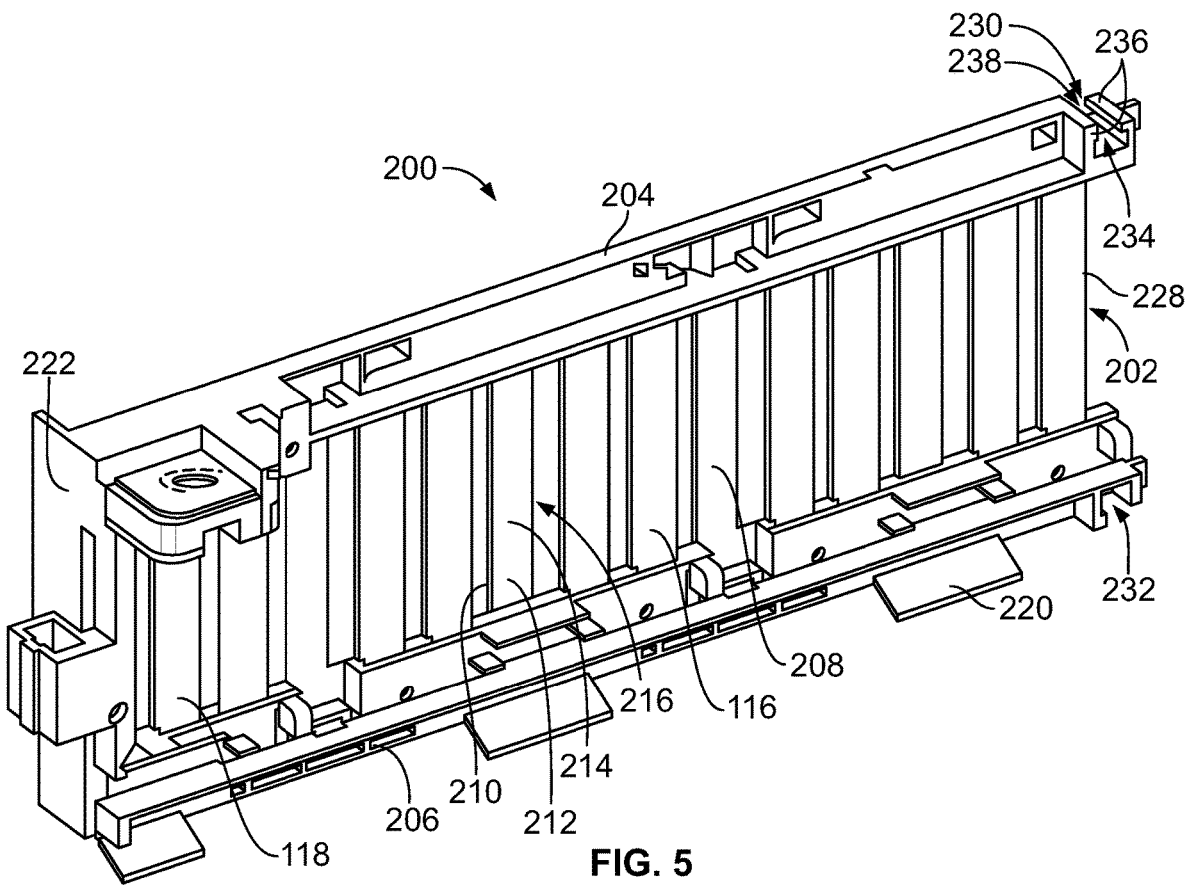
FIG. 5 is a perspective view of a first frame section of the battery module frame in accordance with an exemplary embodiment.
Figure 6:
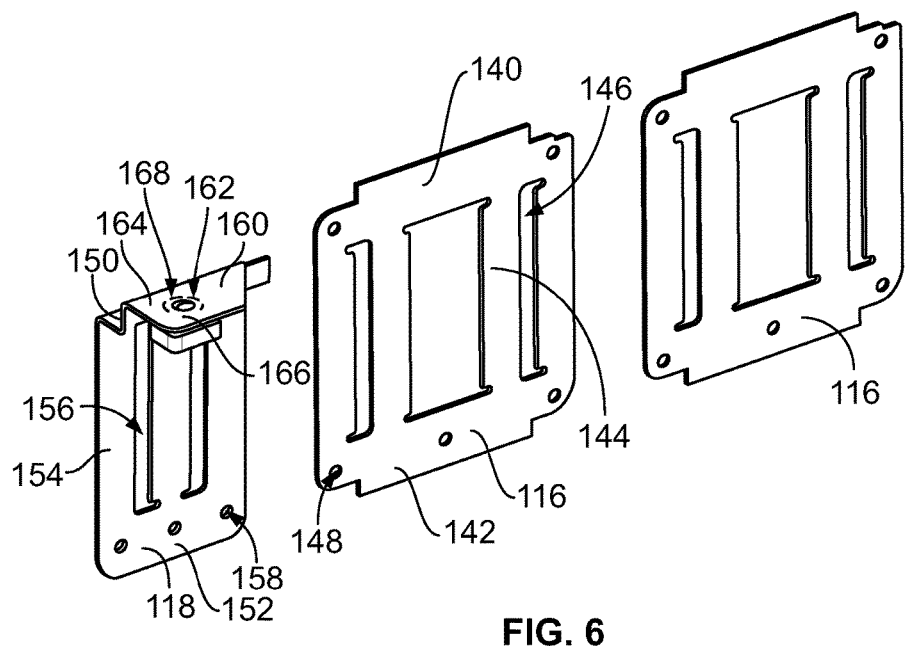
FIG. 6 is a perspective view of bus bars of the first frame section of the battery module frame.

FIG. 5 is a perspective view of the first frame section 200 in accordance with an exemplary embodiment showing the first main body 202 and the corresponding bus bars 116, 118. FIG. 6 is a perspective view of the bus bars 116 and the battery terminal bus bar 118 configured to be coupled to or held by the first main body 202 (shown in FIG. 5). The first main body 202 includes the first bus bar pad 208 holding or receiving the bus bars 116, 118. The first upper side wall 204 is provided at the top of the first main body 202. The first lower side wall 206 is provided at the bottom of the first main body 202. The first bus bar pad 208 extends between the first upper and lower side walls 204, 206.

The first main body 202 includes an inner surface 210 and an outer surface 212. The inner surface 210 is configured to face the battery cells 108 (shown in FIGS. 1 and 2). The outer surface 212 is configured to face away from the battery cells 108. In various embodiments, the bus bars 116, 118 are held by the first bus bar pad 208, such as at the inner surface 210 or at the outer surface 212. For example, the bus bars 116, 118 may be coupled to the inner surface 210 or the outer surface 212. In other various embodiments, the bus bars 116, 118 are embedded in the first bus bar pad 208 between the inner and outer surfaces 210, 212. For example, the bus bars 116, 118 may be overmolded by the first main body 202. With reference to FIG. 6, each bus bar 116 includes an upper rail 140, a lower rail 142, and cross rails 144 extending between the upper and lower rails 140, 142. The cross rails 144 are separated by slots 146. The slots 146 may allow airflow through the bus bar 116. In an exemplary embodiment, the upper and lower rails 140, 142 may include openings 148 configured to receive fasteners, such as threaded fasteners to mechanically and electrically connect the bus bars 116 to the main body 202 and/or the battery cells 108.

With reference to FIG. 6, the battery terminal bus bars 118 are used to electrically connect to corresponding battery terminals 112, 114 (shown in FIG. 1) of the battery module 102. In an exemplary embodiment, each battery terminal bus bars 118 includes an upper rail 150, a lower rail 152, and cross rails 154 extending between the upper and lower rails 150, 152. The cross rails 154 are separated by slots 156. The slots 156 may allow airflow through the battery terminal bus bars 118. The slots 156 may be aligned with corresponding slots 216, 416 in the main bodies 202, 402. In an exemplary embodiment, the upper and lower rails 150, 152 may include openings 158 configured to receive fasteners, such as threaded fasteners to mechanically and electrically connect the battery terminal bus bars 118 to the corresponding battery terminals 112, 114.

In an exemplary embodiment, the battery terminal bus bars 118 are fused bus bars that provide modifiable fused paths through the battery module 102. For example, the current carrying capacity of the fused paths may be increased or decreased at different times. For example, a removable component may be incorporated to bypass the fused paths formed in the structure to increase the current carrying capacity. The battery terminal bus bars 118 provides fused connections for the battery module 102, such as for shipping, handling, and the like prior to assembly and use of the battery module 102 in the vehicle. For example, the battery terminal bus bars 118 provide fused connections within the battery module 102 to prevent overheating or damage to the battery module 102. The battery terminal bus bars 118 may provide fused connections to prevent short-circuiting of the battery module 102, such as during shipping and handling of the battery module 102 prior to installation and assembly in the vehicle when the battery module 102 is connected to a fused circuit to protect the battery module 102. The battery terminal bus bars 118 provide high resistance circuits in the battery module 102 that act as sacrificial devices to provide overcurrent protection. For example, when too much current flows through the battery terminal bus bars 118, the battery terminal bus bars 118 interrupt the battery circuit to interrupt the excessive current so that further damage by overheating or fire is prevented. The battery terminal bus bars 118 may satisfy safety requirements, such as section 38.3 of the UN Manual of Tests and Criteria (UN Transportation Testing UN 38.3), for transportation of the battery module 102, such as transportation between the battery module manufacturer and the vehicle manufacturer that installs the battery module 102 in the vehicle. For example, the transportation may be shipping in an aircraft, boat, train, truck, and the like, such as in a shipping container, subject to accident, dropping, vibration, mechanical shock, and the like.

The battery terminal bus bars 118 are used to electrically connect to the battery terminals 112 or 114 (shown in FIG. 1) of corresponding battery cells 108 (shown in FIG. 1). In an exemplary embodiment, each battery terminal bus bar 118 includes a plate 160 extending from the upper rail 150 configured to be terminated to the corresponding battery terminal 112 or 114. The plate 160 includes a bus bar fuse therein defining a fused circuit within the plate 160. In an overcurrent condition, the bus bar fuse may melt or break thus electrically disconnecting the battery terminal bus bar 118 from the battery terminal 112 or 114. The plate 160 includes connecting strips 162 between a first base section 164 and a second base section 166. Any number of connecting strips 162 may be provided between the base sections 164, 166. The plate 160 has one or more fuse channels 168 associated with the connecting strips 162. The fuse channels 168 reduce the cross-section of the plate 160 at the corresponding connecting strip 162 and fuse channel 168 location. As such, in an overcurrent condition, the bus bar fuse of the plate 160 will fail or break in the reduced cross-section area at the connecting strip 162 and fuse channel 168 location. In an exemplary embodiment, the plate 160 has a reduced fused cross-section relative to a first cross-section of the first base section 164 and a second cross-section of the second base section 166. For example, the fuse channel(s) 168 may reduce the cross-sectional area of the plate 160 as compared to the base sections 164, 166. The connecting strips 162 may have a reduced cross-section as compared to the base sections 164, 166. For example, the thickness and/or width of material in the area of the connecting strips 162 and fuse channels 168 may be reduced as compared to the base sections 164, 166.

The first main body 202 includes frame members 214 and a first end wall 222 extending between the first upper side wall 204 and the first lower side wall 206. The frame members 214 are separated by slots 216 therebetween. The slots 216 may allow airflow through the first frame section 200. The frame members 214 define the first bus bar pad 208. The bus bars 116 may be coupled to corresponding frame members 214, such as having the cross rails 144 coupled to the frame members 214. The bus bars 116 may be received in the slots 216 between corresponding frame members 214. The bus bars 116, 118 may be secured to the frame members 214 and/or the upper and lower side walls 204, 206 using fasteners (not shown). The fasteners may be threaded fasteners.

The first frame section 200 includes mounting brackets 220 extending from the outer surface 212. The mounting brackets 220 are used to mount the first frame section 200 to the battery module 102 (shown in FIG. 1). For example, the mounting brackets 220 may be used to locate and/or secure the first frame section 200 to the covers 134 or other components of the battery module 102. The mounting brackets 220 may be deflectable tabs in various embodiments. The first frame section 200 may include other mounting features, such as for securing the first frame section 200 to the battery cells 108.

The first frame section 200 includes a first upper mounting feature 230 at the first upper side wall 204 and a first lower mounting feature 232 at the first lower side wall 206. The upper and lower mounting features 230, 232 are used to secure the first frame section 200 to the second frame section 300 (or the third frame section 400 when the second frame section 300 is removed). In an exemplary embodiment, the upper and lower mounting features 230, 232 are provided at an edge 228 of the first frame section 200.

In the illustrated embodiment, the upper and lower mounting features 230, 232 are similar to each other. For example, the upper and lower mounting features 230, 232 are of the same type (for example, both female type mounting features). The upper and lower mounting features 230, 232 may have the same shape. In the illustrated embodiment, the upper and lower mounting features 230, 232 include sockets 234. In various embodiments, the upper and lower mounting features 230, 232 are dovetail sockets having angled rails 236 defining a track 238 (see FIGS. 5-6) configured to receive corresponding dovetails of the second frame section 300. Other types of mounting features may be provided in alternative embodiments. In other various embodiments, the upper mounting feature 230 may be different than the lower mounting feature 232. For example, the upper mounting feature 230 may be a female type mounting feature and the lower mounting feature 232 may be a male type mounting feature, or vice versa.

Figure 7:
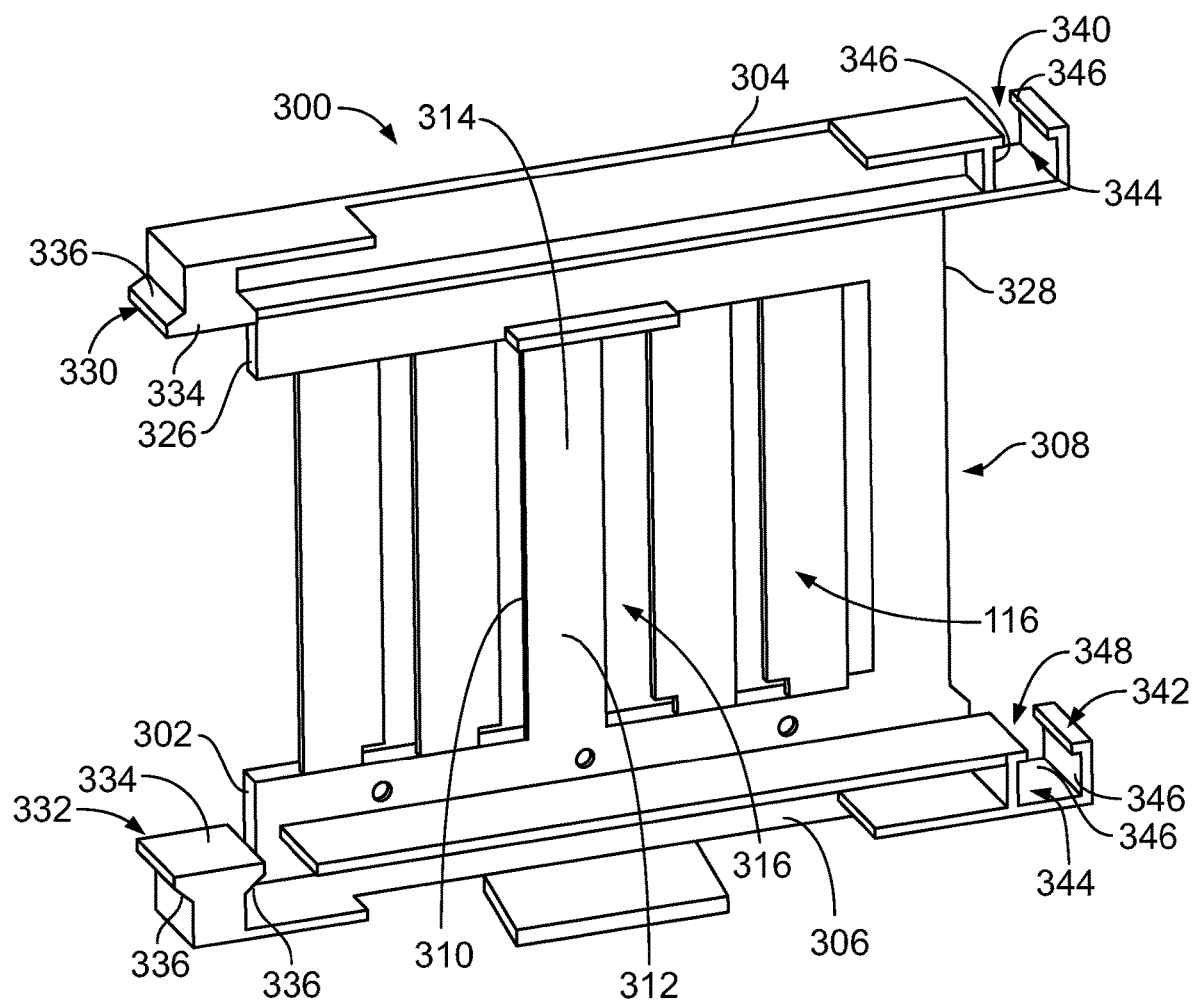
FIG. 7 is a perspective view of a second frame section of the battery module frame in accordance with an exemplary embodiment.
Figure 8:
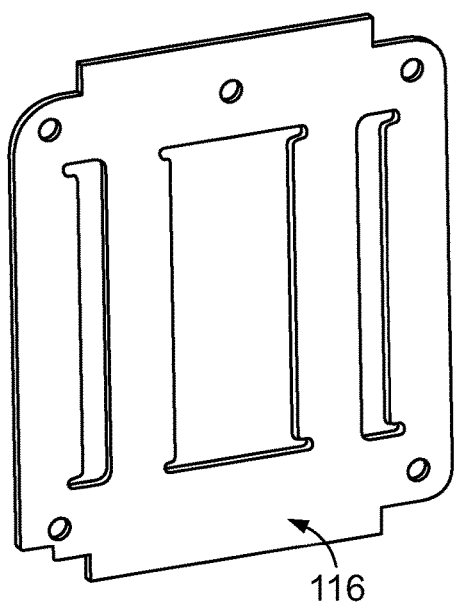
FIG. 8 is a perspective view of bus bar of the second frame section.

FIG. 7 is a perspective view of the second frame section 300 in accordance with an exemplary embodiment showing the first main body 302 and the corresponding bus bar(s) 116. FIG. 8 is a perspective view of the bus bar 116 configured to be coupled to or held by the second main body 302 (shown in FIG. 7). The second main body 302 includes the second bus bar pad 308 holding or receiving the bus bar 116. The second upper side wall 304 is provided at the top of the second main body 302. The second lower side wall 306 is provided at the bottom of the second main body 302. The second bus bar pad 308 extends between the second upper and lower side walls 304, 306.

The second main body 302 includes an inner surface 310 and an outer surface 312. The inner surface 310 is configured to face the battery cells 108 (shown in FIGS. 1 and 2). The outer surface 312 is configured to face away from the battery cells 108. In an exemplary embodiment, the outer surface 312 is configured to hold the bus bar 116. Alternatively, the inner surface 310 may be configured to hold the bus bar 116. For example, the bus bar 116 may be coupled to the inner surface 310 or the outer surface 312. In other various embodiments, the bus bar 116 is embedded in the second bus bar pad 308 between the inner and outer surfaces 310, 312. For example, the bus bar 116 may be overmolded by the second main body 302.

The second main body 302 includes frame members 314 extending between the second upper side wall 304 and the second lower side wall 306. The frame members 314 are separated by slots 316 therebetween. The slots 316 may allow airflow through the second frame section 300. The frame members 314 define the second bus bar pad 308. The bus bar 116 may be coupled to corresponding frame members 314. The bus bar 116 may be received in the slots 216 between corresponding frame members 314. The bus bar 116 may be secured to the frame members 314 and/or the upper and lower side walls 304, 306 using fasteners (not shown).

The second frame section 300 includes a second upper mounting feature 330 at the second upper side wall 304 and a second lower mounting feature 332 at the second lower side wall 306. The upper and lower mounting features 330, 332 are used to secure the second frame section 300 to the first frame section 200. In an exemplary embodiment, the upper and lower mounting features 330, 332 are provided at an edge 328 of the second frame section 300.

In the illustrated embodiment, the upper and lower mounting features 330, 332 are similar to each other. For example, the upper and lower mounting features 330, 332 are of the same type (for example, both male type mounting features). The upper and lower mounting features 330, 332 may have the same shape. In the illustrated embodiment, the upper and lower mounting features 330, 332 includes posts or tails 334. In various embodiments, the tails 334 having angled side walls 336 defining a dovetail. Other types of mounting features may be provided in alternative embodiments. In other various embodiments, the upper mounting feature 330 may be different than the lower mounting feature 332. For example, the upper mounting feature 330 may be a male type mounting feature and the lower mounting feature 332 may be a female type mounting feature, or vice versa.

The second frame section 300 includes a fourth upper mounting feature 340 at the second upper side wall 304 and a fourth lower mounting feature 342 at the second lower side wall 306. The upper and lower mounting features 340, 342 are used to secure the second frame section 300 to the third frame section 400. In an exemplary embodiment, the upper and lower mounting features 340, 342 are provided at an edge 326 of the second frame section 300 opposite the edge 328.

In the illustrated embodiment, the upper and lower mounting features 340, 342 are similar to each other. For example, the upper and lower mounting features 340, 342 are of the same type (for example, both female type mounting features). The upper and lower mounting features 340, 342 may have the same shape. In the illustrated embodiment, the upper and lower mounting features 340, 342 includes sockets 344. In various embodiments, the sockets 344 having angled rails 346 defining a track 348. Other types of mounting features may be provided in alternative embodiments. In other various embodiments, the upper mounting feature 340 may be different than the lower mounting feature 342. For example, the upper mounting feature 340 may be a female type mounting feature and the lower mounting feature 342 may be a male type mounting feature, or vice versa. In an exemplary embodiment, the fourth upper mounting feature 340 is identical to the first upper mounting feature 230 and the fourth lower mounting feature 342 is identical to the first lower mounting feature 232. For example, the mounting features 340, 342 are sized, shaped, and positioned identical to the mounting features 230, 232 such that the mating interface at the edge 326 of the second frame section 300 is identical to the mating interface at the edge 228 of the first frame section 200. As such, the first frame section 200 and the second frame section 300 are both configured for mating with the third frame section 400.

Figure 9:
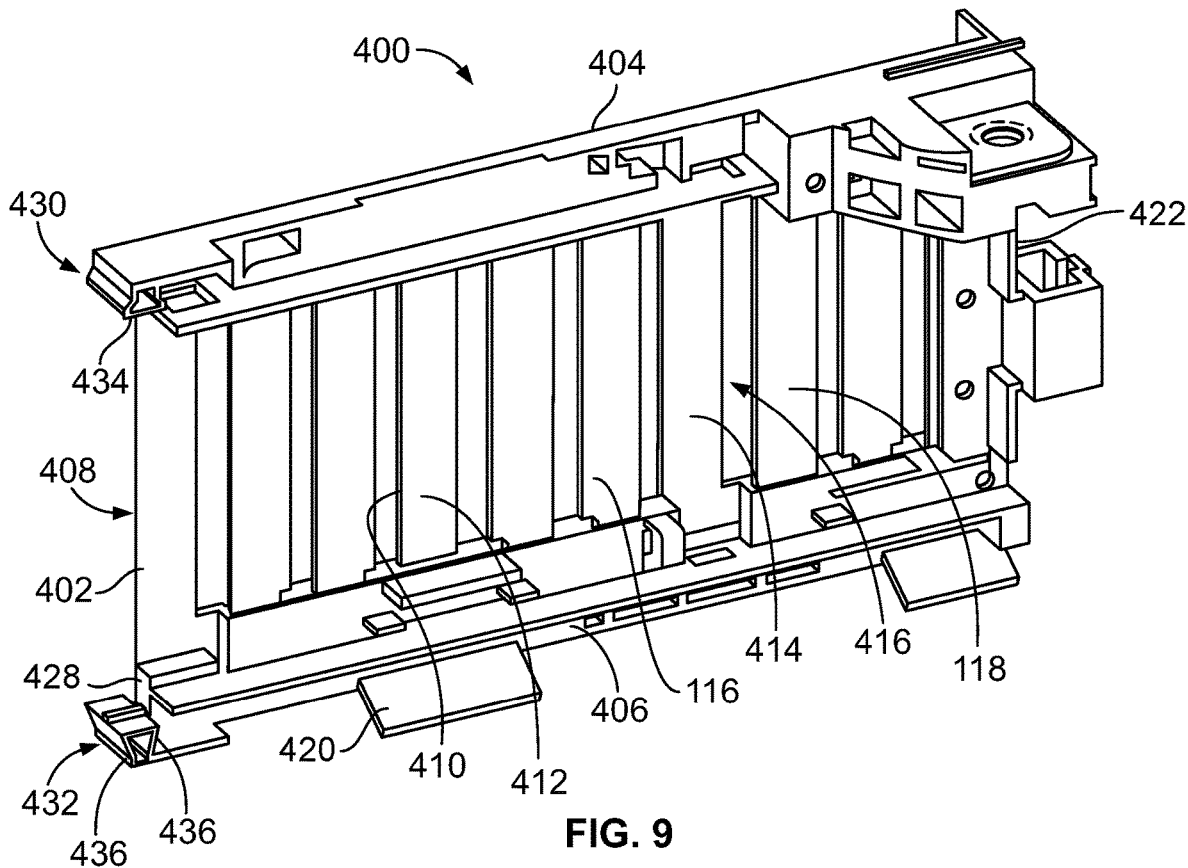
FIG. 9 is a perspective view of a third frame section of the battery module frame in accordance with an exemplary embodiment.
Figure 10:
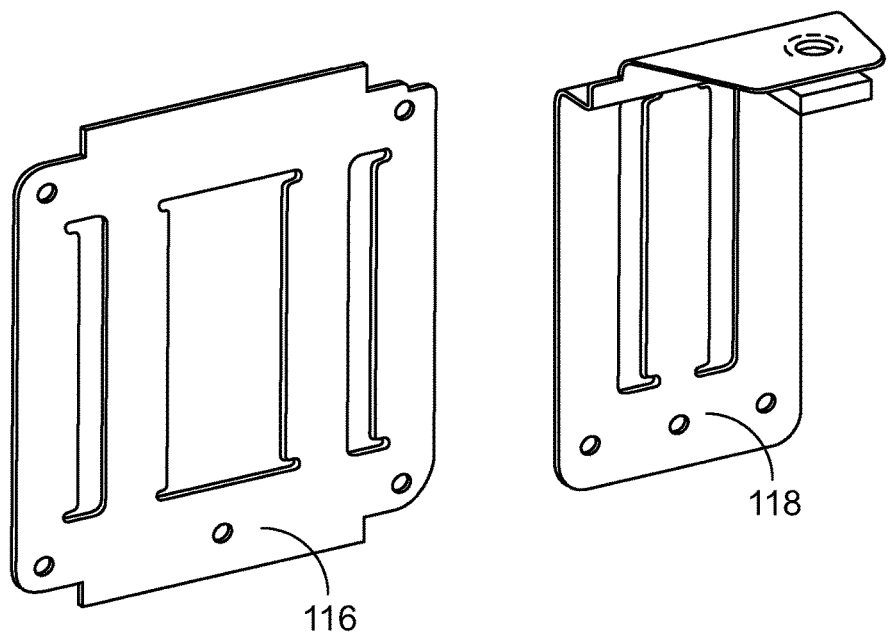
FIG. 10 is a perspective view of a bus bars of the third frame section.

FIG. 9 is a perspective view of the third frame section 400 in accordance with an exemplary embodiment showing the third main body 202 and the corresponding bus bars 116, 118. FIG. 10 is a perspective view of the bus bars 116 and the battery terminal bus bar 118 configured to be coupled to or held by the second main body 402 (shown in FIG. 9). The third main body 402 includes the third bus bar pad 408 holding or receiving the bus bars 116, 118. The third upper side wall 404 is provided at the top of the third main body 402. The third lower side wall 406 is provided at the bottom of the third main body 402. The third bus bar pad 408 extends between the third upper and lower side walls 404, 406.

The third main body 402 includes an inner surface 410 and an outer surface 412. The inner surface 410 is configured to face the battery cells 108 (shown in FIGS. 1 and 2). The outer surface 412 is configured to face away from the battery cells 108. In various embodiments, the bus bars 116, 118 are held by the third bus bar pad 408, such as at the inner surface 410 or at the outer surface 412. For example, the bus bars 116, 118 may be coupled to the inner surface 410 or the outer surface 412. In other various embodiments, the bus bars 116, 118 are embedded in the third bus bar pad 408 between the inner and outer surfaces 410, 412. For example, the bus bars 116, 118 may be overmolded by the third main body 402.

The third main body 402 includes frame members 414 and a third end wall 422 extending between the third upper side wall 404 and the third lower side wall 406. The frame members 414 are separated by slots 416 therebetween. The slots 416 may allow airflow through the third frame section 400. The frame members 414 define the third bus bar pad 408. The bus bars 116 may be coupled to corresponding frame members 414. The bus bars 116 may be received in the slots 416 between corresponding frame members 414. The bus bars 116, 118 may be secured to the frame members 414 and/or the upper and lower side walls 404, 406 using fasteners (not shown).

The third frame section 400 includes mounting brackets 420 extending from the outer surface 412. The mounting brackets 420 are used to mount the third frame section 400 to the battery module 102. For example, the mounting brackets 420 may be used to locate and/or secure the third frame section 400 to the covers 134 or other components of the battery module 102. The mounting brackets 420 may be deflectable tabs in various embodiments. The third frame section 400 may include other mounting features, such as for securing the third frame section 400 to the battery cells 108.

The third frame section 400 includes a third upper mounting feature 430 at the third upper side wall 404 and a third lower mounting feature 432 at the third lower side wall 406. The upper and lower mounting features 430, 432 are used to secure the third frame section 400 to the second frame section 300 (or the first frame section 200 when the second frame section 300 is removed). In an exemplary embodiment, the upper and lower mounting features 430, 432 are provided at an edge 428 of the third frame section 400.

In the illustrated embodiment, the upper and lower mounting features 430, 432 are similar to each other. For example, the upper and lower mounting features 430, 432 are of the same type (for example, both male type mounting features). The upper and lower mounting features 430, 432 may have the same shape. In the illustrated embodiment, the upper and lower mounting features 430, 432 include posts or tails 434. In various embodiments, the tails 434 having angled side walls 436 defining a dovetail. Other types of mounting features may be provided in alternative embodiments. In other various embodiments, the upper mounting feature 430 may be different than the lower mounting feature 432. For example, the upper mounting feature 430 may be a male type mounting feature and the lower mounting feature 432 may be a female type mounting feature, or vice versa. In an exemplary embodiment, the third upper mounting feature 430 is identical to the second upper mounting feature 330 and the third lower mounting feature 432 is identical to the second lower mounting feature 332. For example, the mounting features 330, 332 are sized, shaped, and positioned identical to the mounting features 430, 432 such that the mating interface at the edge 428 of the third frame section 400 is identical to the mating interface at the edge 328 of the second frame section 300. As such, the second frame section 300 and the third frame section 400 are both configured for mating at the edge 228 of the first frame section 200 (or for mating with the mating interface at the edge 326 of another second frame section 300).

Figure 11:
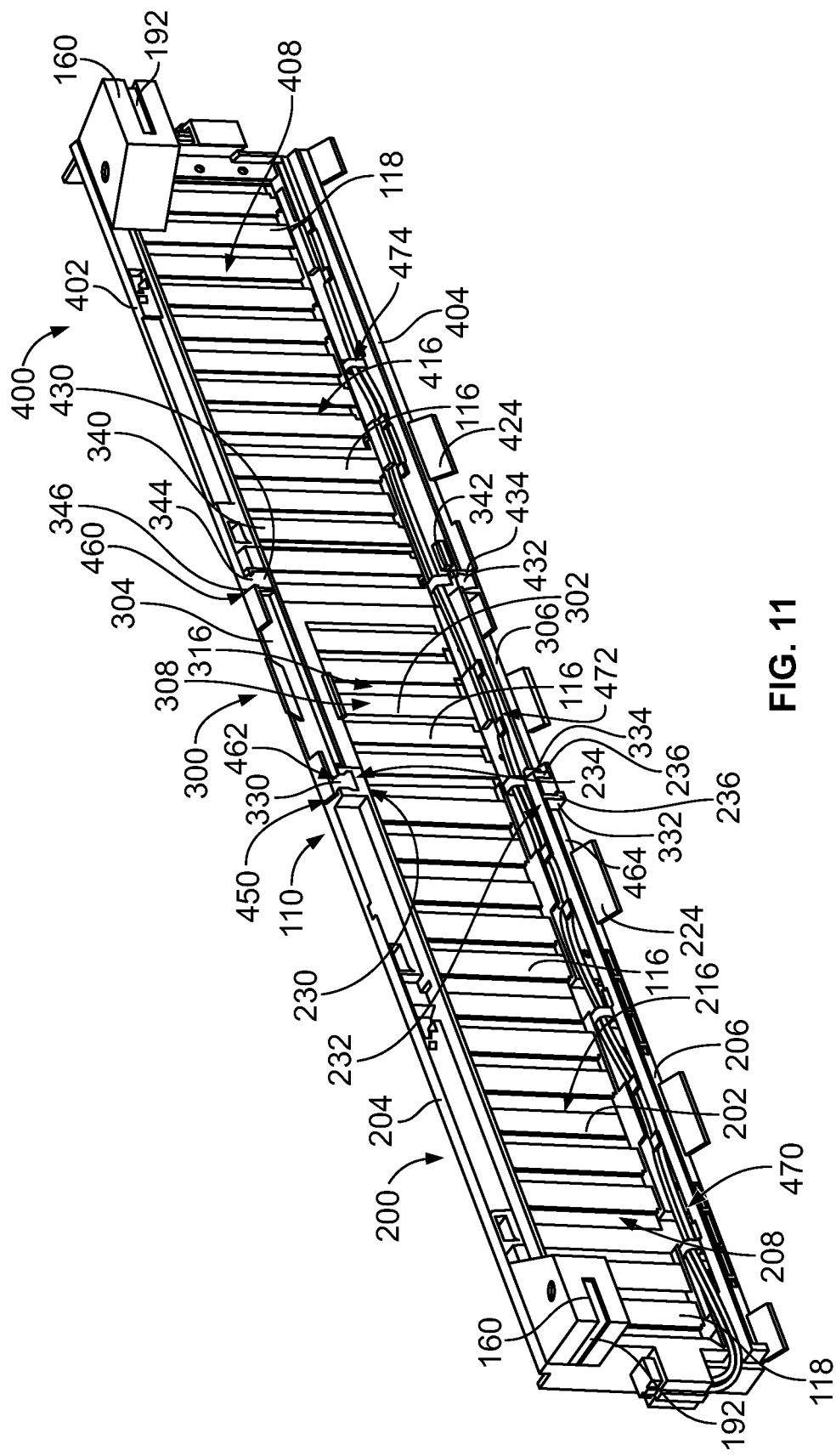
FIG. 11 is a perspective view of the battery module frame in an assembled state in accordance with an exemplary embodiment.

FIG. 11 is a perspective view of the battery module frame 110 in an assembled state in accordance with an exemplary embodiment. FIG. 11 illustrates the second frame section 300 coupled to the first frame section 200 at a separable mating interface and illustrates the third frame section 400 coupled to the second frame section 300 at a separable mating interface. In an exemplary embodiment, when the frame sections 200, 300, 400 are coupled together, the bus bar pads 208, 308, 408 are co-planer. The mounting features of the frame sections 200, 300, 400 mechanically couple the main bodies 202, 302, 402 together to form a continuous plate across the battery module frame 110.

The frame sections 200, 300 are coupled at a seam 450 of the battery module frame 110. The first upper mounting feature 230 is removably coupled to the second upper mounting feature 330 at an upper separable interface 452. The first lower mounting feature 232 is removably coupled to the second lower mounting feature 332 at a lower separable interface 454. The sockets 234 receive the tails 334. The rails 236 prevent horizontal and vertical movement of the tails 334 within the sockets 234. In an exemplary embodiment, the tails 334 may be latchably coupled to the rails 236 within the socket 234.

The frame sections 300, 400 are coupled at a seam 460 of the battery module frame 110. The third upper mounting feature 430 is removably coupled to the fourth upper mounting feature 340 at an upper separable interface 462. The third lower mounting feature 432 is removably coupled to the fourth lower mounting feature 342 at a lower separable interface 464. The sockets 344 receive the tails 434. The rails 346 prevent horizontal and vertical movement of the tails 434 within the sockets 344. In an exemplary embodiment, the tails 434 may be latchably coupled to the rails 346 within the socket 344.

In the illustrated embodiment, the upper and lower side walls 204, 206, 304, 306, 404, 406 have a thickness (between inner and outer surfaces) that is thicker than the bus bar pads 208, 308, 408. Pockets 470, 472, 474 are defined between the upper and lower side walls 204, 206, 304, 306, 404, 406 in the frame sections 200, 300, 400, which receive the bus bars 116. The thicker side walls 204, 206, 304, 306, 404, 406 add structural rigidity to the frame sections 200, 300, 400. The slots 216, 316, 416 allow airflow through the battery module frame 110 and/or reduce the amount of material used and/or to reduce the weight of the battery module frame 110.

The first frame section 200 includes a mounting tabs 224 that receives and supports the corresponding battery terminal bus bar 118. The third frame section 400 includes a mounting tabs 424 that receives and supports the corresponding battery terminal bus bar 118. In an exemplary embodiment, the battery module frame 110 includes support plates 192 for supporting the plates 160 of the battery terminal bus bars 118. The support plates 192 may be coupled to the mounting tabs 224, 424.

Figure 12:
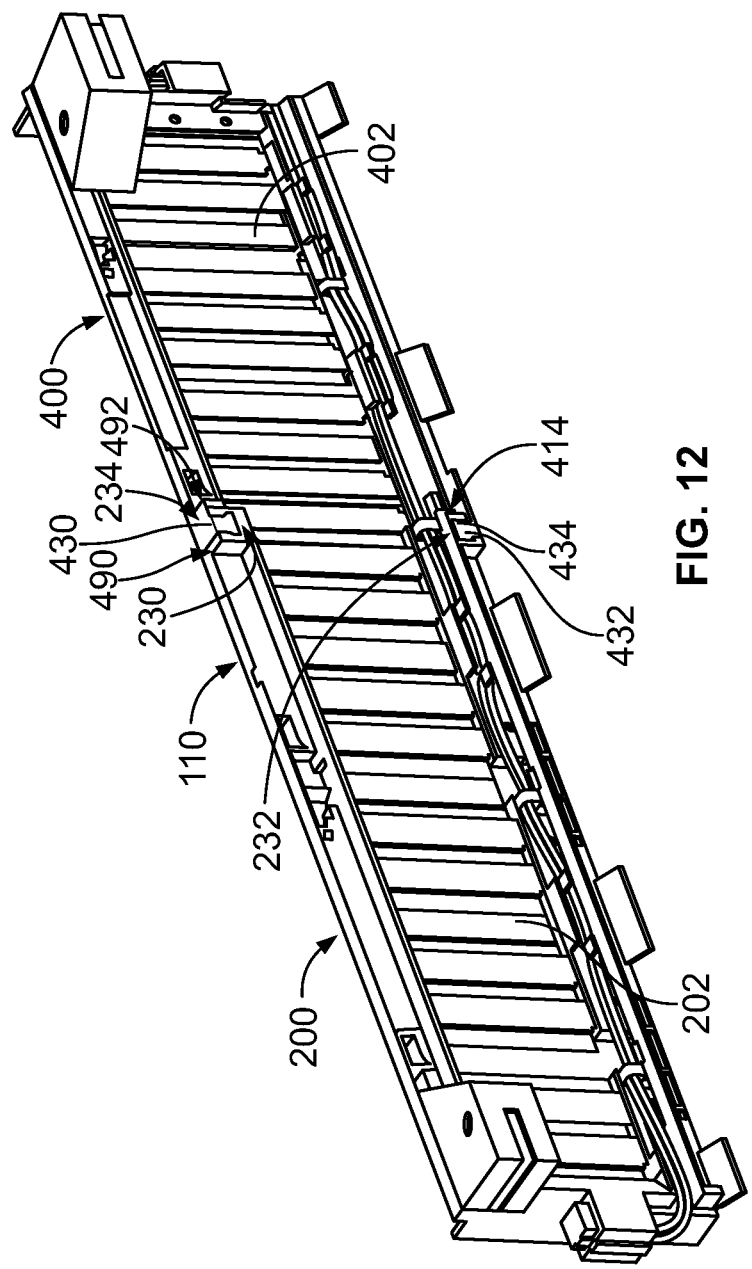
FIG. 12 is a perspective view of the battery module frame in an assembled state in accordance with an exemplary embodiment.

FIG. 12 is a perspective view of the battery module frame 110 in an assembled state in accordance with an exemplary embodiment. FIG. 12 illustrates the battery module frame 110 with the first frame section 200 directly coupled to the third frame section 400. The battery module frame 110 has the second frame section 300 (shown in FIG. 11) removed. The first and third frame sections 200, 400 are coupled at a separable mating interface. The mounting features of the frame sections 200, 400 mechanically couple the main bodies 202, 402 together to form a continuous plate across the battery module frame 110.

During assembly, the frame sections 200, 400 are coupled at a seam 490 of the battery module frame 110. The first upper mounting feature 230 is removably coupled to the third upper mounting feature 430 at an upper separable interface 492. The first lower mounting feature 232 is removably coupled to the third lower mounting feature 432 at a lower separable interface 494. The sockets 234 receive the tails 434.

FIG. 13 is a perspective view of the rear battery module frame 110b in an assembled state in accordance with an exemplary embodiment. The rear battery module frame 110b is similar to the front battery module frame 110a (shown in FIG. 11) and includes similar features and components; however, the rear battery module frame 110b does not include the positive and negative battery terminal bus bars 118 (shown in FIG. 11). FIG. 13 illustrates the second frame section 300 coupled to the first frame section 200 at a separable mating interface and illustrates the third frame section 400 coupled to the second frame section 300 at a separable mating interface.

The mounting features of the frame sections 200, 300, 400 mechanically couple the main bodies 202, 302, 402 together to form a continuous plate across the battery module frame 110. The first upper mounting feature 230 is removably coupled to the second upper mounting feature 330 at the upper separable interface 452. The first lower mounting feature 232 is removably coupled to the second lower mounting feature 332 at the lower separable interface 454. The third upper mounting feature 430 is removably coupled to the fourth upper mounting feature 340 at the upper separable interface 462. The third lower mounting feature 432 is removably coupled to the fourth lower mounting feature 342 at the lower separable interface 464.

FIG. 14 is a perspective view of the battery module frame 110 in an assembled state in accordance with an exemplary embodiment. FIG. 14 illustrates the battery module frame 110 with the first frame section 200 directly coupled to the third frame section 400. The battery module frame 110 has the second frame section 300 (shown in FIG. 13) removed. The mounting features of the frame sections 200, 400 mechanically couple the main bodies 202, 402 together to form a continuous plate across the battery module frame 110. The first upper mounting feature 230 is removably coupled to the third upper mounting feature 430 at the upper separable interface 492. The first lower mounting feature 232 is removably coupled to the third lower mounting feature 432 at the lower separable interface 494.

Figure 15:
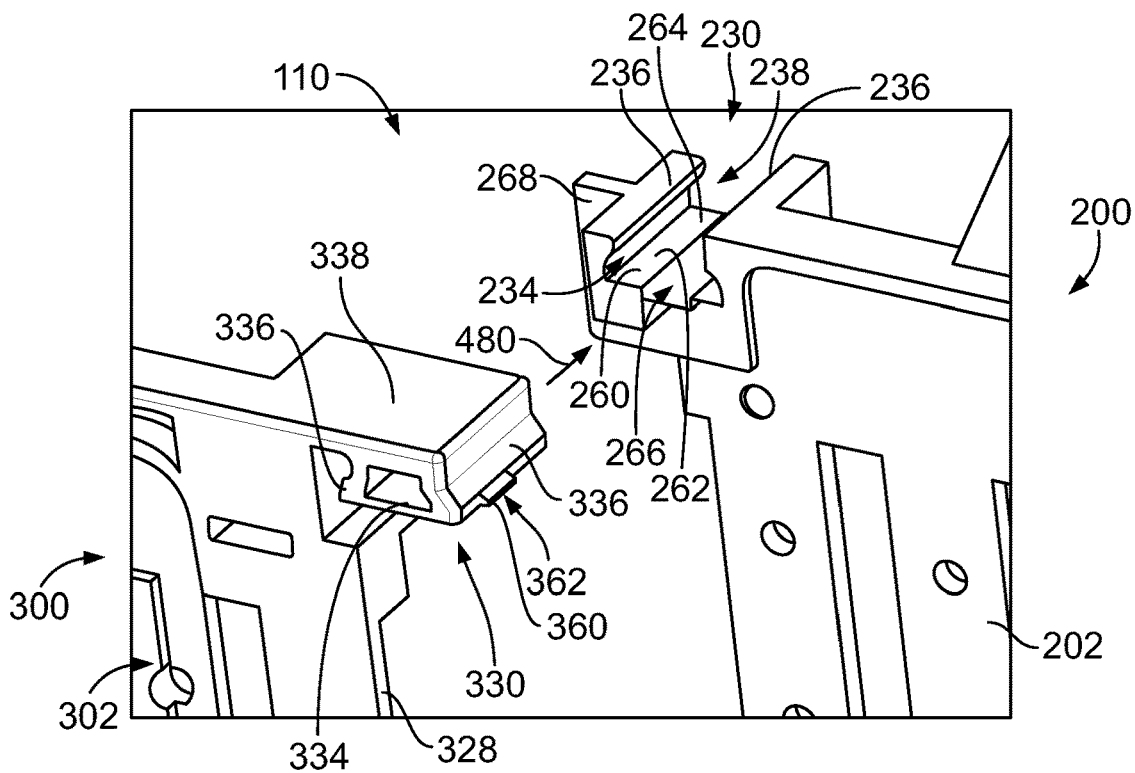
FIG. 15 is an enlarged, perspective view of a portion of the battery module frame in accordance with an exemplary embodiment.

FIG. 15 is an enlarged, perspective view of a portion of the battery module frame 110 in accordance with an exemplary embodiment. FIG. 15 illustrates the second upper mounting feature 330 poised for mating with the first upper mounting feature 230. In an exemplary embodiment, the second frame section 300 is mated to the first frame section 200 in a mating direction 480 perpendicular to the first and second main bodies 202, 302.

The socket 234 and the tail 334 have complementary shapes. The socket 234 is sized and shaped to receive the tail 334. The socket 234 is open at an outer end 235 to receive the tail 334. The socket 234 may be open at an inner end 237 to receive the tail 334. The rails 236 are provided on opposite sides of the socket 234 to define the track 238. The track 238 guides the tail 334 into the socket 234. In an exemplary embodiment, the rails 236 are angled nonparallel to each other. For example, in the illustrated embodiment, the rails 236 are angled inward such that the socket 234 is narrower at the top and wider at the bottom. The socket 234 may have other shapes in alternative embodiments. Optionally, the rails 236 may be parallel to the mating direction 480. In other various embodiments, the rails 236 may be angled transverse to the mating direction 480 such that the rails 236 taper inward from the outer end 235 to the inner end 237, such as to pinch or squeeze the tail 334 as the tail 334 is loaded into the socket 234.

In an exemplary embodiment, the socket 234 includes a latching feature 260 for latchably securing the tail 334 in the socket 234. In the illustrated embodiment, the latching feature 260 is defined by one or more catch surfaces 262 configured to engage and secure the tail 334 and the socket 234. In the illustrated embodiment, the catch surfaces 262 are provided along a base wall 264 of the upper mounting feature 230. The catch surfaces 262 may additionally or alternatively be provided along the rails 236. In an exemplary embodiment, the upper mounting feature 230 includes a relief channel 266 between the latching features 260 configured to receive a tool, such as a screwdriver, to release the tail 334 from the latching feature 260. Other types of latching features may be provided in alternative embodiments, such as openings, deflectable latches, and the like.

In an exemplary embodiment, the upper mounting feature 230 includes a stop shoulder 268 extending therefrom, such as exterior of the socket 234. The second upper mounting features 330 is configured to engage the stop shoulder 268 to position the second frame section 300 relative to the first frame section 200 during mating. For example, the stop shoulder 268 may restrict movement of the second frame section 300 relative to the first frame section 200 in the mating direction 480 once the second frame section 300 engages the stop shoulder 268.

In an exemplary embodiment, the tail 334 extends outward from the edge 328. The tail 334 includes a support arm 338 cantilevered from the edge 328. The tail 334 extends downward from the support arm 338. In an exemplary embodiment, the side walls 336 are angled nonparallel to each other. For example, in the illustrated embodiment, the side walls 336 are angled outward such that the tail 334 is narrower at the top and wider at the bottom. The tail 334 may have other shapes in alternative embodiments. Optionally, the side walls 336 may be parallel to the mating direction 480. In other various embodiments, the side walls 336 may be angled transverse to the mating direction 480 such that the tail 334 is tapered inward from an outer end 335 to an inner end 337, such as being wedge shaped to wedge into the socket 234 as the tail 334 is loaded into the socket 234.

In an exemplary embodiment, the tail 334 includes a latching feature 360 for latchably securing the tail 334 in the socket 234. In the illustrated embodiment, the latching feature 360 is defined by a flange 362 extending from the bottom of the tail 334 configured to engage the latching features 260 and secure the tail 334 in the socket 234. The latching feature 360 may be provided at other locations in alternative embodiments, such as along the side walls 336. Other types of latching features may be provided in alternative embodiments, such as openings, deflectable latches, and the like.

Figure 16:
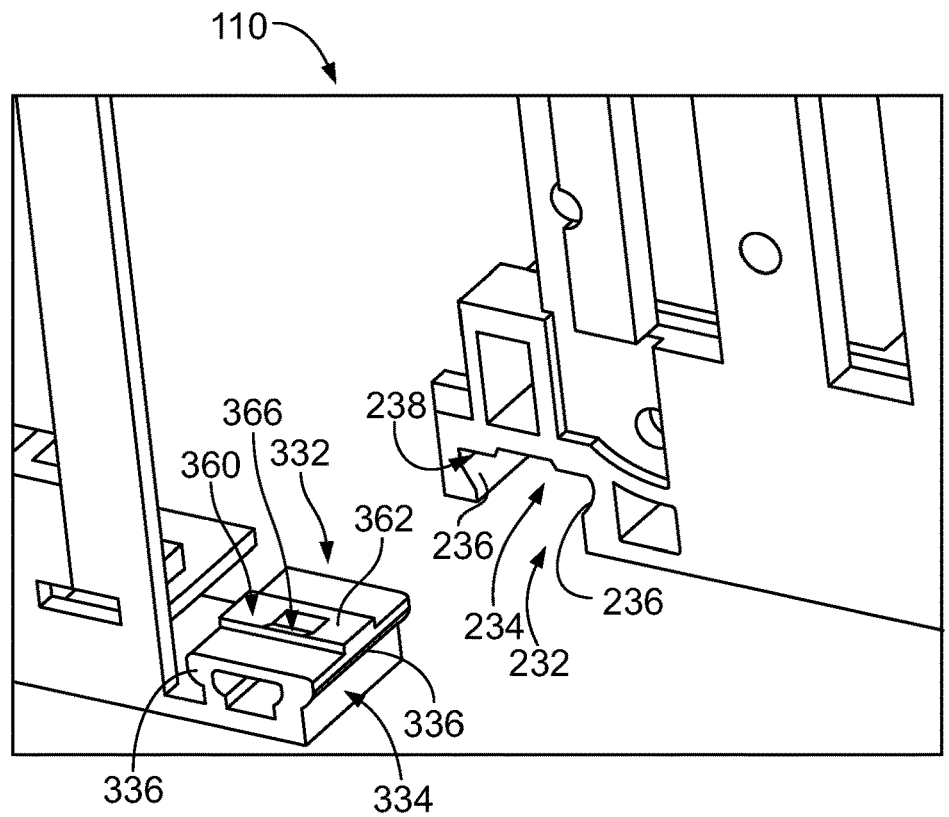
FIG. 16 is an enlarged, perspective view of a portion of the battery module frame in accordance with an exemplary embodiment.

FIG. 16 is an enlarged, perspective view of a portion of the battery module frame 110 in accordance with an exemplary embodiment. FIG. 16 illustrates the second lower mounting feature 332 poised for mating with the first lower mounting feature 232. In an exemplary embodiment, the lower mounting features 232, 332 may be similar to the upper mounting features 230, 330 (both shown in FIG. 5), respectively, and like features may be identified with like reference numerals.

The socket 234 and the tail 334 have complementary shapes. The rails 236 are provided on opposite sides of the socket 234 to define the track 238, which is used to guide the tail 334 into the socket 234. In an exemplary embodiment, the rails 236 are angled nonparallel to each other, such as being angled inward such that the socket 234 is narrower at the bottom and wider at the top. The side walls 336 of the tail 334 are angled nonparallel to each other, such as being angled outward such that the tail 334 is narrower at the bottom and wider at the top. The latching feature 360 is provided at the top of the tail 334. In an exemplary embodiment, the latching feature 360 includes a relief channel 366 in the flange 362 configured to receive a tool, such as a screwdriver, to release the latching feature 360 from the latching feature 260.

Figure 17:
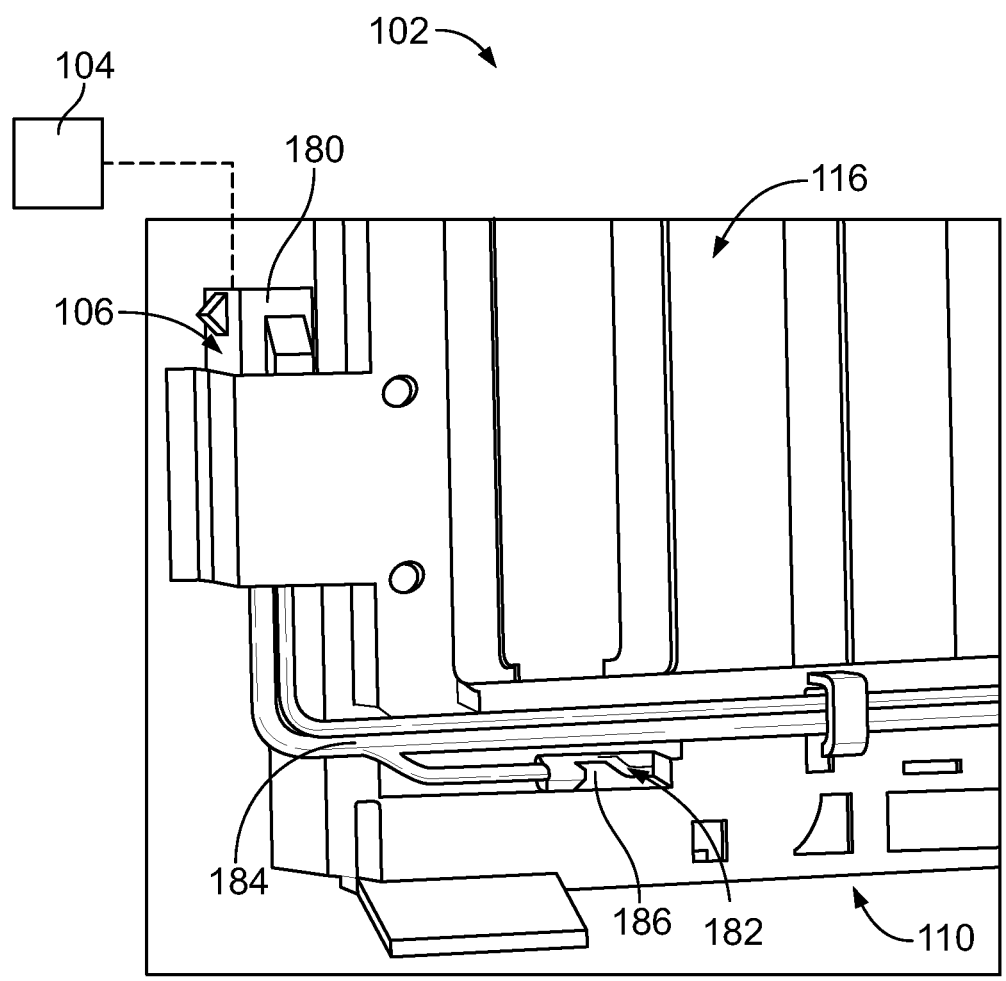
FIG. 17 is a perspective view of a portion of the battery module illustrating a connector assembly coupled to the battery module frame.

FIG. 17 is a perspective view of a portion of the battery module 102 illustrating the connector assembly 106 coupled to the battery module frame 110. The bus bars 116 are used to electrically connect to corresponding battery cells 108 (shown in FIGS. 1 and 2). The connector assembly 106 is electrically connected to the bus bars 116, such as for voltage monitoring of the bus bars 116.

The connector assembly 106 includes an electrical connector 180 and sensor assembly 182 coupled to the electrical connector 180. The electrical connector 180 may include a housing holding a plurality of contacts. The electrical connector 180 is configured to be mated to the battery control module 104 (shown in FIG. 1). The sensor assembly 182 includes a cable 184 electrically connected to the contacts of the electrical connector 180. In the illustrated embodiment, the cable 184 is a flat flexible cable, such as a flexible circuit board. Other types of cables 184 may be provided in alternative embodiments, such as a cable having individual wires or wires contained within a common cable jacket. The sensor assembly 182 includes voltage sensors 186 configured to be electrically connected to corresponding bus bars 116 and/or battery cells 108. In an exemplary embodiment, the sensor assembly 182 includes temperature sensors (not shown) configured to be coupled to corresponding bus bars 116 and/or battery cells 108. Other types of sensors may be provided as part of the sensor assembly 182 in alternative embodiments.

Figure 18:
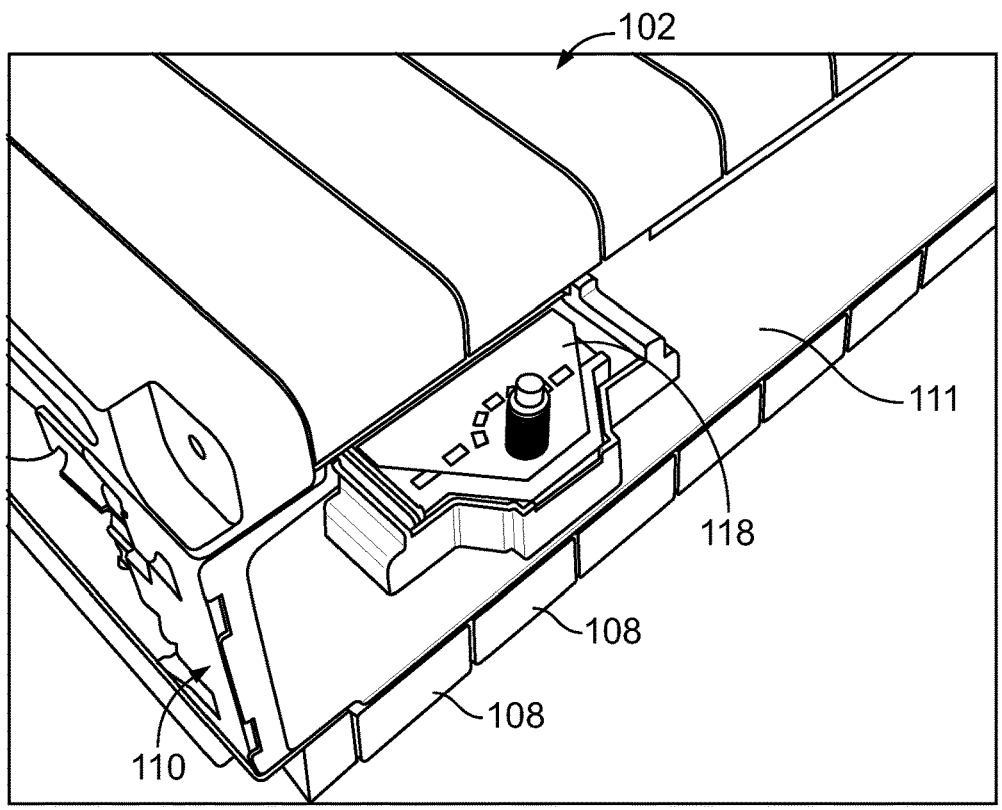
FIG. 18 is a perspective view of a portion of the battery module showing the battery module frame coupled to the battery cells.

FIG. 18 is a perspective view of a portion of the battery module 102 showing the battery module frame 110 coupled to the battery cells 108. FIG. 18 shows battery terminal bus bar 118. The cover 111 is coupled to the battery module frame 110 to cover the bus bars 116. The battery terminal bus bar 118 is exposed through the cover 111 for connection to the battery terminal 112 or 114 (shown in FIG. 1).

Figure 19:
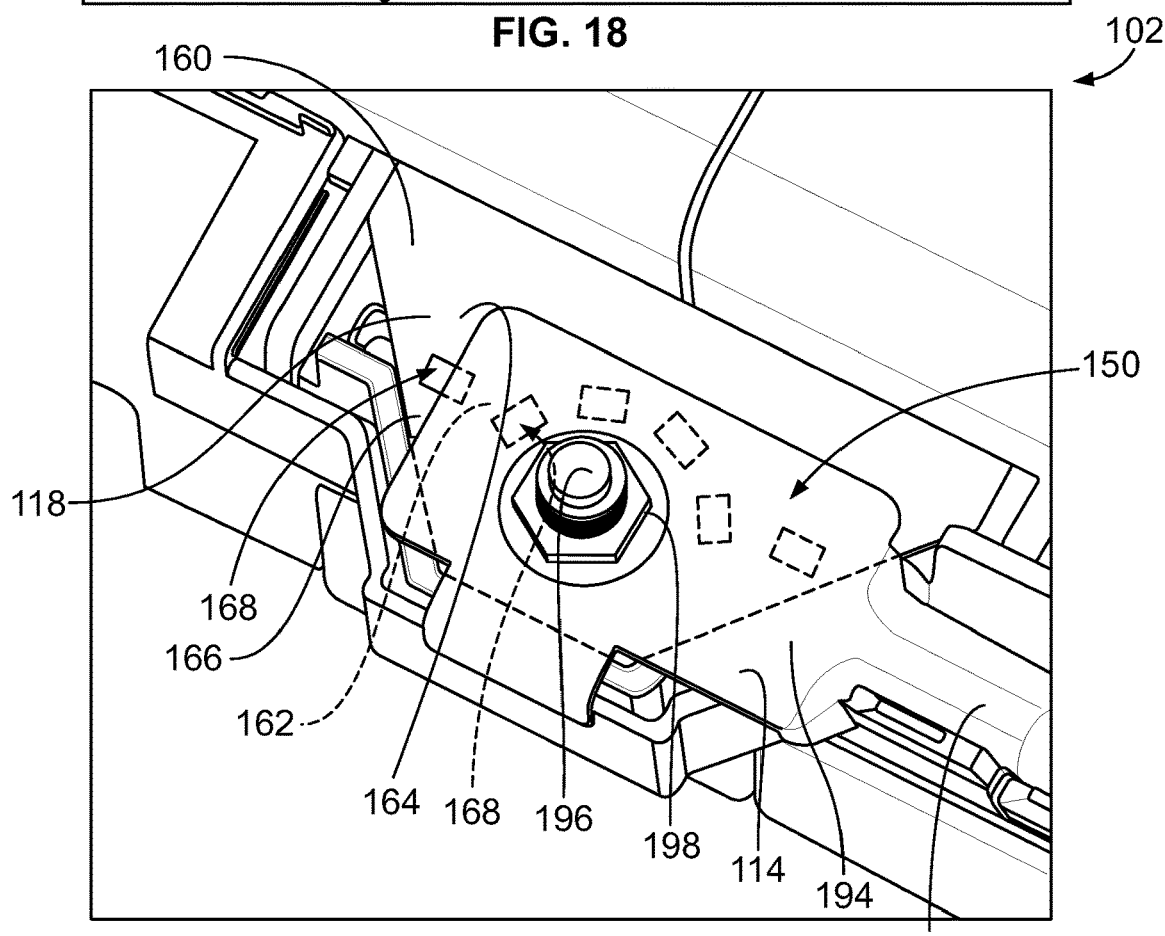
FIG. 19 is a perspective view of a portion of the battery module showing the battery terminal coupled to the battery terminal bus bar.

FIG. 19 is a perspective view of a portion of the battery module 102 showing the battery terminal 114 coupled to the battery terminal bus bar 118. The battery terminal 114 includes a base 194 and a terminating end 195 extending from the base for terminating to a power cable. In the illustrated embodiment, the terminating end 195 is a crimp barrel; however, other types of terminating ends may be provided in alternative embodiments, such as a weld pad. The base 194 of the battery terminal 114 overlaps the plate 160 of the battery terminal bus bar 118 and is electrically connected to the plate 160. In an exemplary embodiment, a threaded post 196 and a threaded nut 198 are used to mechanically and electrically connect the battery terminal 114 and the battery terminal bus bar 118. When the nut 198 is tightened, the base 194 is compressed against the plate to electrically connect the battery terminal 114 to the battery terminal bus bar 118.

In an exemplary embodiment, the battery terminal 114 defines a fuse bridge 500 for the bus bar fuse of the battery terminal bus bar 118. The base 194 spans across the bus bar fuse of the battery terminal bus bar 118 to define the fuse bridge 500. When the nut 198 is tightened, the fuse bridge 500 is pressed downward against the plate 160 and spans across the fuse channels 168 (shown in phantom). The fuse bridge 500 is electrically coupled to the first and second base sections 164, 166. In various embodiments, the base 194 may be spring biased against the first base section 164 and/or the second base section 166 when the nut 198 is tightened to ensure a reliable electrical connection with the plate 160. When installed, the overlapping base 194 increases the current carrying capacity of the battery terminal bus bar 118, as compared to the current carrying capacity allowed by the plate 160 without the overlapping base 194. Some of the current passes through the connecting strips 162 between the base sections 164, 166 while some of the current passes through the fuse bridge 500 of the battery terminal 114. When the battery terminal 114 is assembled, the fuse function of the battery terminal bus bar 118 is eliminated.

Figure 20:
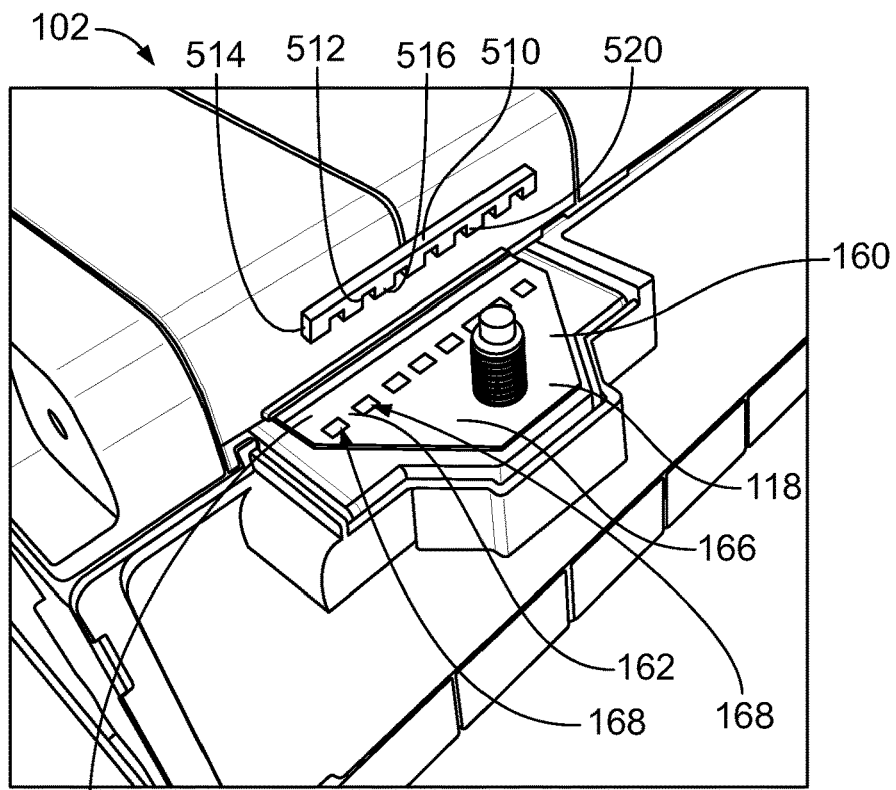
FIG. 20 is a perspective view of a portion of the battery module showing the battery terminal bus bar and a fuse bridge in accordance with an exemplary embodiment.
Figure 21:
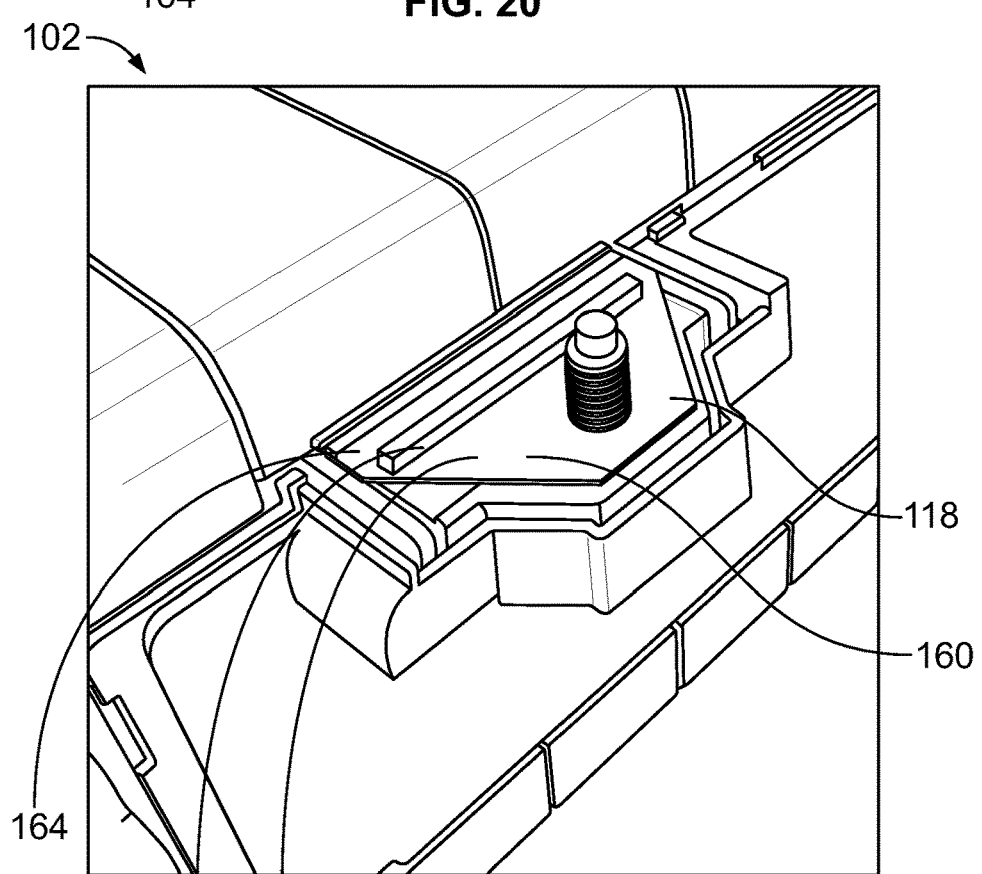
FIG. 21 is a perspective view of a portion of the battery module showing the fuse bridge coupled to the battery terminal bus bar in accordance with an exemplary embodiment.

FIG. 20 is a perspective view of a portion of the battery module 102 showing the battery terminal bus bar 118 and a fuse bridge 510 in accordance with an exemplary embodiment. FIG. 21 is a perspective view of a portion of the battery module 102 showing the fuse bridge 510 coupled to the battery terminal bus bar 118 in accordance with an exemplary embodiment. The fuse bridge 510 is separate and discrete from the battery terminal bus bar 118 and is separate and discrete from the battery terminal 114 (shown in FIG. 19). The fuse bridge 510 is configured to be coupled to the plate 160 of the battery terminal bus bar 118 to bridge the first and second base sections 164, 166. The fuse bridge 510 spans the fuse channels 168 to electrically connect the first base section 164 and the second base section 166. The fuse bridge 510 increases the current carrying capacity between the base sections 164, 166. For example, the cumulative current carrying capacity of the fuse bridge 510 and the connecting strips 162 is greater than the current carrying capacity of just the connecting strips 162.

The fuse bridge 510 is removably coupled to the plate 160 such that the current carrying capacity when the fuse bridge 510 is present and assembled (FIG. 21) is greater than when the fuse bridge 510 is unassembled (FIG. 20) and thus not present. For example, prior to installation and assembly of the battery module 102 into the vehicle, the fuse bridge 510 may be decoupled from the plate 160, providing a fused circuit in the battery terminal bus bar 118, such as for shipping and handling of the battery module 102 (for example, from the time of manufacture of the battery module 102 until installation of the battery module 102 in the vehicle). Once the battery module 102 is installed in the vehicle, the fuse bridge 510 may be coupled to the plate 160 to increase the current carrying capacity of the battery module 102 through the battery terminal bus bar 118. The fuse function is eliminated after the fuse bridge 510 is assembled because the system is capable of handling the higher current.

Optionally, the fuse bridge 510 may include a connecting strip interface 512 engaging one or more of the connecting strips 162. In an exemplary embodiment, the fuse bridge 510 includes a first interface 514 engaging the first base section 164 and a second interface 516 engaging the second base section 166. The body of the fuse bridge 510 electrically connects the interfaces 512, 514, 516 to electrically connect the base sections 164, 166. For example, the body of the fuse bridge 510 may be a single, unitary metal structure. Optionally, the fuse bridge 510 may extend into and be received in the fuse channels 168. For example, the fuse bridge 510 may include protrusions 520 extending into corresponding fuse channels 168. The protrusions 520 may define the connecting strip interface 512 and/or the first interface 514 and/or the second interface 516. In an exemplary embodiment, the fuse bridge 510 is a jammer block configured to be pressed into the plate 160 to mechanically and electrically connect to the plate 160. For example, the jammer block may be jammed into the fuse channels 168.

When assembled, the fuse bridge 510 spans the fuse channels 168 between the base sections 164, 166. The protrusions 520 at least partially fill in the fuse channels 168 between the first and second base sections 164, 166 and/or between the connecting strips 162. Optionally, the protrusions 520 may have a complementary shape as the fuse channels 168 to substantially or entirely fill the fuse channels 168. The protrusions 520 may have chamfered lead-ins to ease assembly. The protrusions 520 may be press-fit into the fuse channels 168. For example, the protrusions may engage the base sections 164, 166 and/or the connecting strips 162 by an interference fit. The protrusions 520 and/or the plate 160 may include crush ribs that are deformed when the fuse bridge 510 is coupled to the plate 160. In the illustrated embodiment, the protrusions 520 pass entirely through the plate 160. When assembled, the connecting strips 162 carry current between the first and second base sections 164, 166 and the fuse bridge 510 carries current between the first and second base sections 164, 166. For example, the protrusions 520 may directly engage both base sections 164, 166 to electrically connect the base sections 164, 166 and carry current therebetween. The protrusions 520 may also directly engage both adjacent connecting strips 162 to electrically connect the connecting strips 162 and carry current therebetween.

The battery terminal bus bar 118 provides a fused circuit for the battery module 102 to satisfy safety requirements, such as section 38.3 of the UN Manual of Tests and Criteria (UN Transportation Testing UN 38.3), for transportation of the battery module 102, and provides the fuse bridge 500 or 510 to be assembled to the battery module 102 when the battery module 102 is in use in the vehicle. As such, the battery module 102 is safe when being transported between the battery module manufacturer and the vehicle manufacturer that installs the battery module 102 in the vehicle by provided a fused circuit path that may be opened to prevent overheating and fire, such as when short circuited during transportation. However, the fuse bridge 500 or 510, when installed, increases the current carrying capacity of the plate 160 to acceptable performance levels, such as equivalent to the bus bars 116, to allow normal operation of the battery module 102 in the vehicle. The battery module 102 is less susceptible to malfunction from a blown fuse during use in the vehicle as the battery terminal bus bar 118 is capable of handling normal operating currents that the bus bars 116 handle. Furthermore, the fuse bridge 500 or 510 provides an inexpensive solution to increasing the current carrying capacity of the battery terminal bus bar 118 as compared to conventional fuses that are utilized in some conventional battery modules and then discarded after the battery module is installed in the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A battery module frame for a battery module comprising:
   a first frame section having a first main body, a first upper side wall extending from the first main body and a first lower side wall extending from the first main body, the first main body having first frame members extending between the first upper side wall and the first lower side wall, the first frame members being separated by elongated slots between the first upper side wall and the first lower side wall, the first frame members forming a first bus bar pad for a bus bar configured to be electrically connected to battery cells of the battery module, the slots between the first frame members configured to be aligned with slots in the bus bar, the first upper side wall including a first upper mounting feature, the first lower side wall including a first lower mounting feature; and
   a second frame section separate and discrete from the first frame section, the second frame section having a second main body, a second upper side wall extending from the second main body and a second lower side wall extending from the second main body, the second main body having second frame members extending between the second upper side wall and the second lower side wall, the second frame members being separated by elongated slots between the second upper side wall and the second lower side wall, the second frame members forming a second bus bar pad for a bus bar configured to be electrically connected to battery cells of the battery module, the slots between the second frame members configured to be aligned with slots in the bus bar, the second upper side wall including a second upper mounting feature, the second lower side wall including a second lower mounting feature;

wherein the first and second frame sections are coupled at a seam with the second upper mounting feature removably coupled to the first upper mounting feature at an upper separable interface and the second lower mounting feature removably coupled to the first lower mounting feature at a lower separable interface, the first and second frame sections being coupled together with the first and second bus bar pads of the first and second main bodies coplanar.

2. The battery module frame of claim 1, wherein the first upper mounting feature includes a socket and the second upper mounting feature includes a tail received in the socket.

3. The battery module frame of claim 1, wherein the first upper mounting feature and the first lower mounting feature are both either male-style mounting features or female-style mounting features, and wherein the second upper mounting feature and the second lower mounting feature are both the other of male-style mounting features or female-style mounting features.

4. The battery module frame of claim 1, wherein the first upper mounting feature and the first lower mounting feature include latches and the second upper mounting feature and the second lower mounting feature include latches interacting with the latches of the first upper mounting feature and the first lower mounting feature to couple the first frame section to the second frame section.

5. The battery module frame of claim 1, wherein the first upper mounting feature includes rails defining a track receiving the second upper mounting feature, the rails being nonparallel to each other.

6. The battery module frame of claim 1, wherein the first upper side wall includes a stop shoulder, the second upper side wall engaging the stop shoulder to position the first frame section relative to the second frame section.

7. The battery module frame of claim 1, wherein the first frame section and the second frame section are mated in a mating direction perpendicular to the first and second main bodies.

8. The battery module frame of claim 1, further comprising a third frame section separate and discrete from the first and second frame sections, the third frame section having a third main body, a third upper side wall extending from the third main body and a third lower side wall extending from the third main body, the third main body having a third bus bar pad for a bus bar configured to be electrically connected to battery cells of the battery module, the third upper side wall including a third upper mounting feature, the third lower side wall including a third lower mounting feature;

wherein the second upper side wall of the second frame section further comprises a fourth upper mounting feature and the second lower side wall of the second frame section further comprises a fourth lower mounting feature; and wherein the third upper mounting feature is removably coupled to the fourth upper mounting feature and the third lower mounting feature is removably coupled to the fourth lower mounting feature such that the second frame section is located between the first frame section and the third frame section.

9. The battery module frame of claim 8, wherein the third upper mounting feature is identical to the second upper mounting feature and the third lower mounting feature is identical to the second lower mounting feature, and wherein the first upper mounting feature is identical to the fourth upper mounting feature and the first lower mounting feature is identical to the fourth lower mounting feature.

10. The battery module frame of claim 1, wherein the first frame members and the slots extending a majority of a height between the first upper side wall and the first lower side wall, the second frame members and the slots extending a majority of a height between the second upper side wall and the second lower side wall.

11. The battery module frame of claim 1, wherein the first frame section includes a first end wall between the first upper side wall and the first lower side wall, the first frame section including a battery terminal bus bar mounting tab for a battery terminal bus bar configured to be electrically connected to a battery cell of the battery module and configured to be electrically connected to a terminal.

12. The battery module frame of claim 1, further comprising a cover coupled to the first and second frame sections to cover the first and second bus bar pads, the cover spanning across the seam.

13. The battery module frame of claim 1, further comprising a sensor assembly coupled to the first main body and the second main body, the sensor assembly including voltage sensors configured to be electrically connected to corresponding battery cells of the battery module.

14. The battery module frame of claim 1, further comprising a battery terminal bus bar coupled to the first main body, the battery terminal bus bar configured to be electrically connected to a battery cell of the battery module, the battery terminal bus bar having a terminal pad configured to be electrically connected to a terminal, the battery terminal bus bar including a fuse element providing a fuse function for the battery terminal bus bar.

15. The battery module frame of claim 14, wherein the terminal pad includes at least one connecting strip between a first pad section and a second pad section, the terminal pad having a fuse channel associated with the at least one connecting strip, the fuse channel reducing a cross-section of the terminal pad at the corresponding connecting strip such that the connecting strip has a reduced fused cross-section relative to a first cross-section of the first pad section and a second cross-section of the second pad section, the battery terminal bus bar further comprising a removable fuse bridge coupled to the fuse element, the fuse bridge spanning the fuse channel to electrically connect the first base section and the second base section.

16. A battery module frame for a battery module comprising:

a first frame section having a first main body, a first upper side wall extending from the first main body and a first lower side wall extending from the first main body, the first main body having a right end between the first upper side wall and the first lower side wall and a left end between the first upper side wall and the first lower side wall opposite the right end, the first main body having a first bus bar pad, the first frame section having a first width defined between the opposite right and left ends thereof, the first upper side wall including a first upper mounting feature, the first lower side wall including a first lower mounting feature;

a second frame section separate and discrete from the first frame section, the second frame section having a second main body, a second upper side wall extending from the second main body and a second lower side wall extending from the second main body, the second main body having a right end between the second upper side wall and the second lower side wall and a left end between the second upper side wall and the second lower side wall opposite the right end, the second main body having a second bus bar pad, the second frame section having a second width defined between the opposite right and left ends thereof, the second width being different than the first width, the second upper side wall including a second upper mounting feature, the second lower side wall including a second lower mounting feature, the second frame section being coupled to the first frame section at a seam with the second upper mounting feature removably coupled to the first upper mounting feature at an upper separable interface and the second lower mounting feature removably coupled to the first lower mounting feature at a lower separable interface such that the first and second bus bar pads are coplanar;

bus bars coupled to the first and second bus bar pads, the bus bars configured to be electrically connected to battery cells of the battery module; and a sensor assembly coupled to the first and second main bodies, the sensor assembly including voltage sensors electrically coupled to corresponding bus bars.

17. The battery module frame of claim 16, further comprising a third frame section separate and discrete from the first and second frame sections, the third frame section having a third main body, a third upper side wall extending from the third main body and a third lower side wall extending from the third main body, the third main body having a third bus bar pad, the third upper side wall including a third upper mounting feature, the third lower side wall including a third lower mounting feature;

wherein the second upper side wall of the second frame section further comprises a fourth upper mounting feature and the second lower side wall of the second frame section further comprises a fourth lower mounting feature; and wherein the third upper mounting feature is removably coupled to the fourth upper mounting feature and the third lower mounting feature is removably coupled to the fourth lower mounting feature such that the second frame section is located between the first frame section and the third frame section.

18. The battery module frame of claim 16, further comprising a battery terminal bus bar coupled to the first main body, the battery terminal bus bar configured to be electrically connected to a battery cell of the battery module, the battery terminal bus bar having a terminal pad configured to be electrically connected to a terminal, the battery terminal bus bar including a fuse element providing a fuse function for the battery terminal bus bar.

19. The battery module frame of claim 16, wherein the first main body includes first frame members extending between the first upper side wall and the first lower side wall, the first frame members being separated by elongated slots between the first upper side wall and the first lower side wall, the slots between the first frame members configured to be aligned with slots in the bus bar, the second main body having second frame members extending between the second upper side wall and the second lower side wall, the second frame members being separated by elongated slots between the second upper side wall and the second lower side wall, the slots between the second frame members configured to be aligned with slots in the bus bar.

20. The battery module frame of claim 16, further comprising a battery terminal bus bar coupled to the first main body, the battery terminal bus bar configured to be electrically connected to a battery cell of a battery module, the battery terminal bus bar having a terminal pad configured to be electrically connected to a terminal, the battery terminal bus bar including a fuse element providing a fuse function for the battery terminal bus bar, the battery terminal bus bar having a removable fuse bridge coupled to the fuse element changing the fuse function for the battery terminal bus bar.

21. A battery system comprising:

a plurality of battery cells being stacked forming a battery module;

a battery module frame mounted to the battery module, the battery module frame including a first frame section and a second frame section separate and discrete from the first frame section and coupled to the first frame section at a seam, the first frame section having a first main body, a first upper side wall extending from the first main body and a first lower side wall extending from the first main body, the first main body having a first bus bar pad, the first upper side wall including a first upper mounting feature, the first lower side wall including a first lower mounting feature, the second frame section having a second main body, a second upper side wall extending from the second main body and a second lower side wall extending from the second main body, the second main body having a second bus bar pad, the second upper side wall including a second upper mounting feature removably coupled to the first upper mounting feature, the second lower side wall including a second lower mounting feature removably coupled to the first lower mounting feature;

bus bars coupled to the first and second bus bar pads, the bus bars being electrically connected to corresponding battery cells of the battery module; and a battery terminal bus bar coupled to the first main body, the battery terminal bus bar electrically connected to the battery cell of the battery module, the battery terminal bus bar having a terminal pad configured to be electrically connected to a terminal, the battery terminal bus bar including a fuse element providing a fuse function for the battery terminal bus bar, the battery terminal bus bar having a removable fuse bridge coupled to the fuse element changing the fuse function for the battery terminal bus bar, wherein the terminal pad is electrically connected to the terminal through the fuse element and the terminal pad is electrically connected to the terminal through the removable fuse bridge, when present;

wherein the first main body includes first frame members extending between the first upper side wall and the first lower side wall, the first frame members being separated by elongated slots between the first upper side wall and the first lower side wall, the slots between the first frame members configured to be aligned with slots in the bus bar, the second main body having second frame members extending between the second upper side wall and the second lower side wall, the second frame members being separated by elongated slots between the second upper side wall and the second lower side wall, the slots between the second frame members configured to be aligned with slots in the bus bar.

22. The battery system of claim 21, further comprising a third frame section separate and discrete from the first and second frame sections, the third frame section having a third main body, a third upper side wall extending from the third main body and a third lower side wall extending from the third main body, the third main body having a third bus bar pad, the third upper side wall including a third upper mounting feature, the third lower side wall including a third lower mounting feature;

wherein the second upper side wall of the second frame section further comprises a fourth upper mounting feature and the second lower side wall of the second frame section further comprises a fourth lower mounting feature; and wherein the third upper mounting feature is removably coupled to the fourth upper mounting feature and the third lower mounting feature is removably coupled to the fourth lower mounting feature such that the second frame section is located between the first frame section and the third frame section.

23. The battery system of claim 21, further comprising a sensor assembly coupled to the first and second main bodies, the sensor assembly including voltage sensors electrically coupled to corresponding battery cells of the battery module.

\* \* \* \* \*